United States Patent [19]

Stevens et al.

[11] Patent Number: 5,420,860
[45] Date of Patent: May 30, 1995

[54] VOLUME CONTROL FOR DIGITAL COMMUNICATION SYSTEM

[75] Inventors: Christopher J. Stevens; Herbert C. Hendrickson, both of Honolulu, Hi.

[73] Assignee: Intelect, Inc., Mililani, Hi.

[21] Appl. No.: 706,956

[22] Filed: May 29, 1991

Related U.S. Application Data

[63] Continuation-in-part of Ser. No. 539,787, Jun. 18, 1990, Pat. No. 5,276,678.

[51] Int. Cl.6 .............................................. H04L 27/08
[52] U.S. Cl. ..................... 370/62; 375/345; 455/355
[58] Field of Search .............. 370/62, 94.1, 60, 67, 370/68, 85.1; 365/45; 364/600; 379/40, 50, 202; 340/825.26; 84/605, 622; 455/355; 375/98

[56] References Cited

U.S. PATENT DOCUMENTS

| | | |
|---|---|---|
| 4,389,720 | 6/1983 | Baxter et al. ........................ 370/62 |
| 4,499,578 | 2/1985 | Marouf et al. ...................... 370/62 |
| 4,535,445 | 8/1985 | Lane et al. .......................... 370/62 |
| 4,540,850 | 9/1985 | Herr et al. ........................... 370/62 |
| 4,633,749 | 1/1987 | Fujimori et al. ..................... 84/623 |
| 4,648,108 | 3/1987 | Ellis et al. ........................... 370/62 |
| 4,716,585 | 12/1987 | Tompkins et al. .................... 370/62 |
| 4,910,706 | 3/1990 | Hyatt ................................. 365/45 |
| 5,007,049 | 4/1991 | Ohtsuka ............................. 370/62 |
| 5,070,499 | 12/1991 | Maher et al. ........................ 370/61 |
| 5,115,450 | 5/1992 | Arcuri ................................ 375/98 |
| 5,204,976 | 4/1993 | Baldwin et al. ..................... 375/98 |

Primary Examiner—Douglas W. Olms
Assistant Examiner—Dang Ton
Attorney, Agent, or Firm—Richards, Medlock & Andrews

[57] ABSTRACT

A technique for providing volume adjustment capabilities in a digital telecommunication system. A composite two-part address is applied to a memory which stores amplitude adjusted digital voice words. The first part of the address comprises the digital voice word carried by the TDM time slot. The second part of the address comprises a parameter which defines the extent of amplitude adjustment. The readout of the memory thereby defines a different digital voice word having a desired amplitude level. The second address part of the composite address is generated by an amplitude parameter memory in synchronism with each time slot so that the amplitude of the digital voice words in corresponding time slots can be adjusted independently and dynamically with respect to the others.

41 Claims, 10 Drawing Sheets

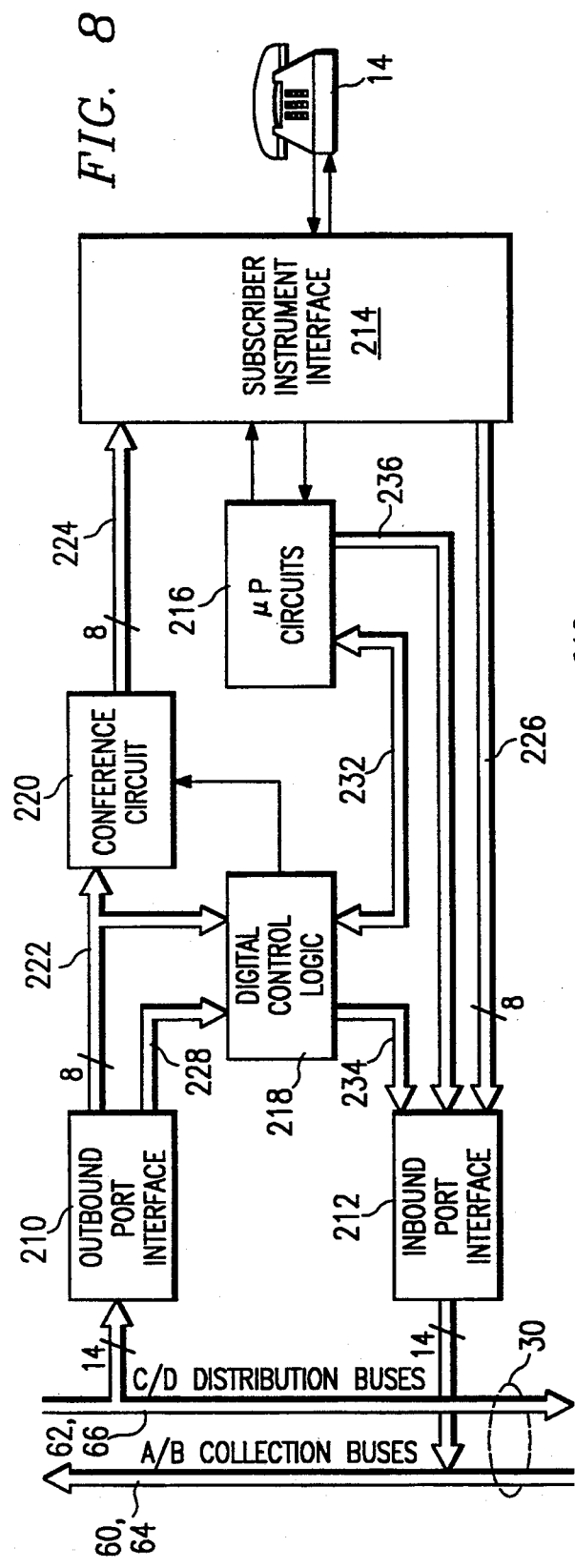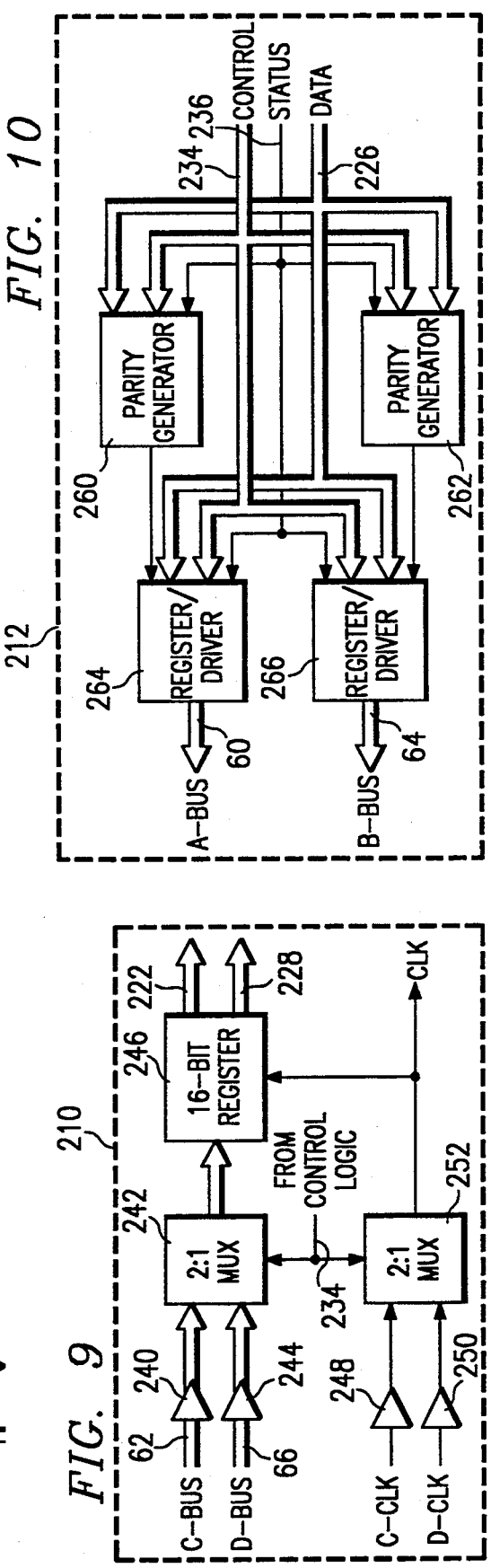

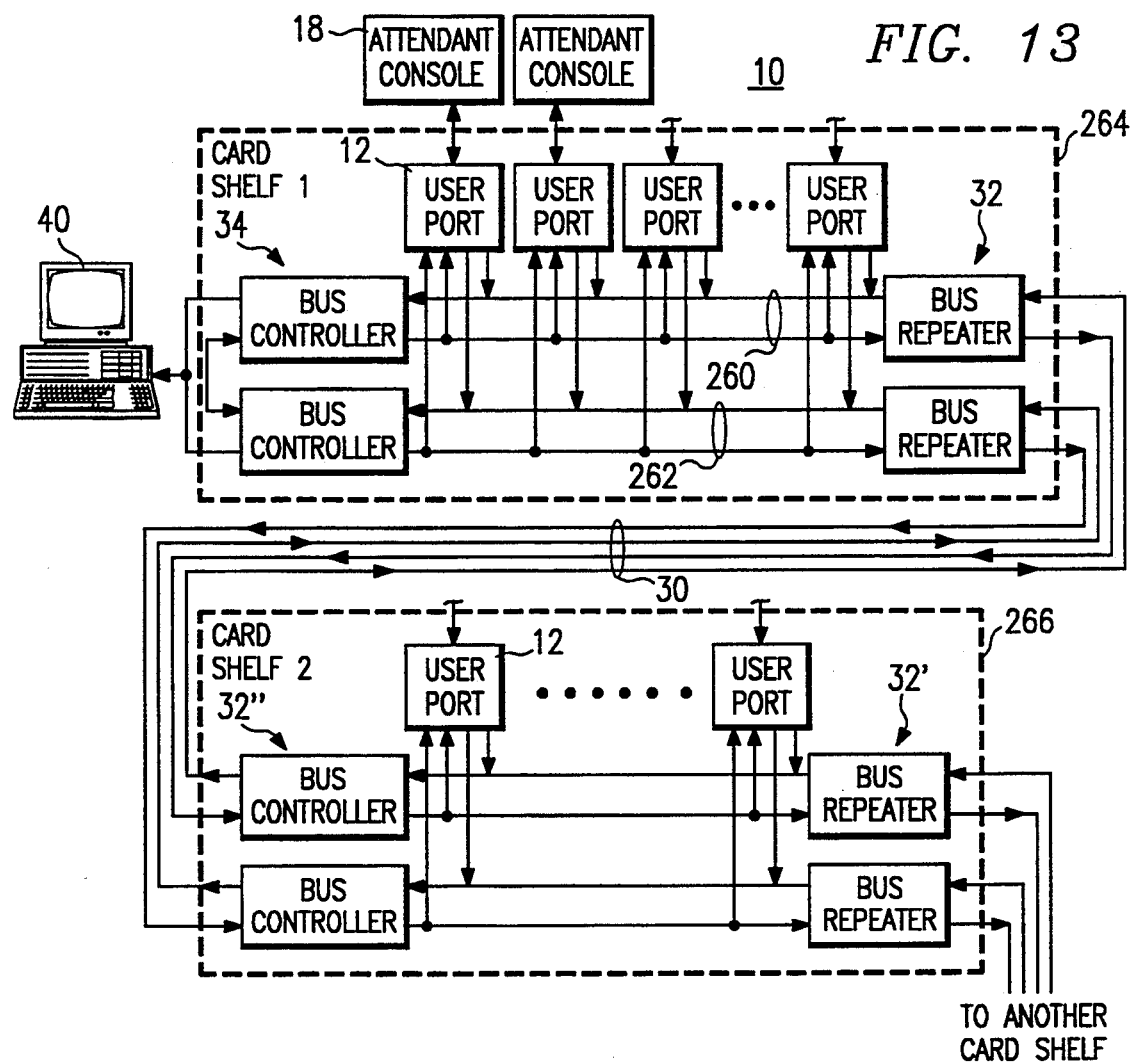

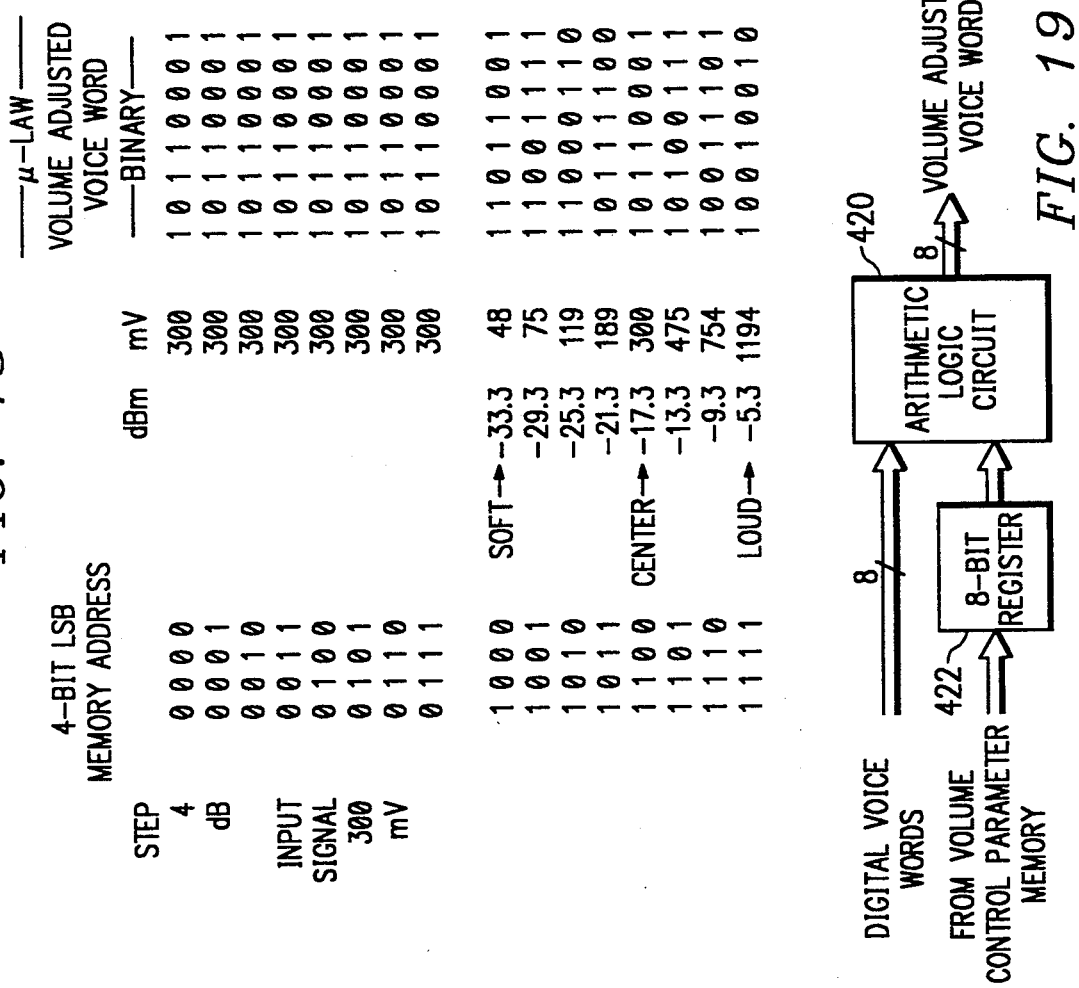
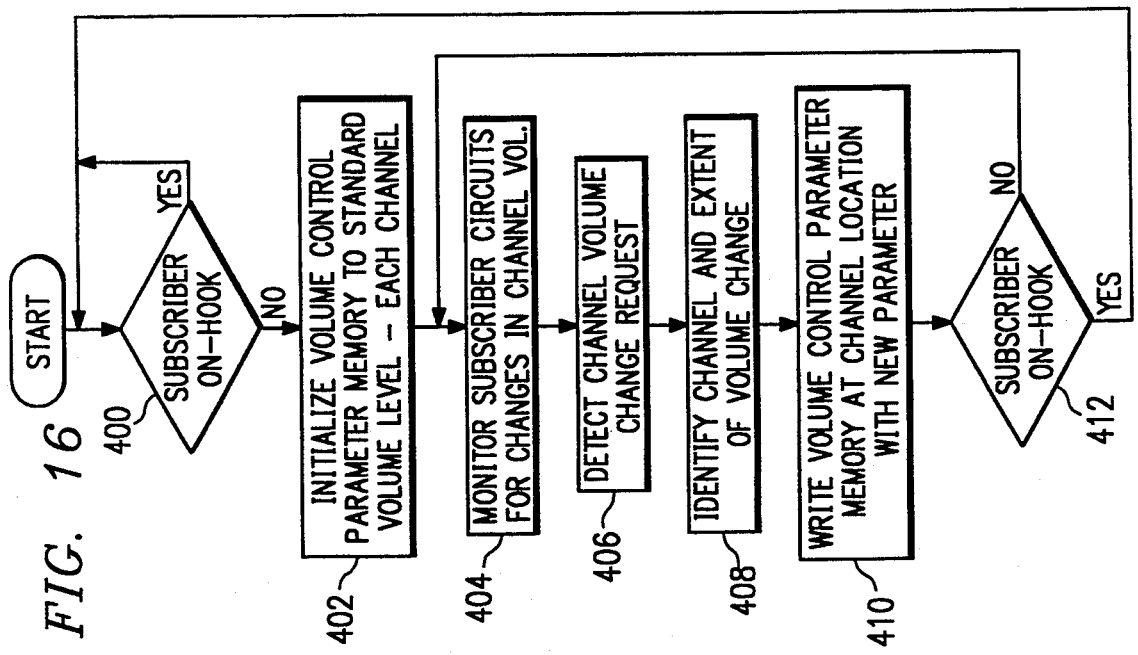

VOLUME CONTROL FOR DIGITAL COMMUNICATION SYSTEM

RELATED APPLICATION

This is a continuation-in-part patent application of U.S. application Ser. No. 539,787 filed Jun. 18, 1990, entitled "Distributed Switching and Telephone Conferencing System", now U.S. Pat. No. 5,276,678.

TECHNICAL FIELD OF THE INVENTION

The present invention relates in general to telecommunication methods and switching equipment, and more particularly to conference systems employed with time division switching systems.

BACKGROUND OF THE INVENTION

In recent decades, the field of telecommunications has experienced a significant growth, due primarily to the development of high level digital circuit integration and microprocessors. While microprocessors and associated circuits may not be well adapted for providing the processing capability in large toll or central office switching systems, the integrated circuit microprocessor is well adapted for use in smaller switching systems, such as private automatic branch exchange systems (PABX), key telephone systems, and other types of on premises and office communication systems.

In many office-type switching systems, call processing capabilities must be provided for carrying out the traditional functions such as initiating calls, carrying on and completing telephone calls. One sophisticated microprocessor control complex for such a telecommunications switching system is disclosed in U.S. Pat. No. 4,256,926. By employing a processor control complex, a great deal of flexibility can be provided in making available numerous features to the users of the system. In addition, an all-digital type of system can employ pulse code modulation (PCM) of the audio signals, time division multiplexing (TDM) techniques and microprocessors, all of which are readily available integrated types of circuits for constructing communication systems.

U.S. Pat. No. 4,257,119 discloses a PCM switching system adapted for carrying wide band and narrow band signals. U.S. Pat. No. 4,627,050 discloses a time division multiplex computerized branch exchange system, while U.S. Pat No. 4,627,047 discloses a telecommunication system switching system adapted for carrying both voice and data signals.

Another feature which is provided by many PABX and other types of switching systems is a conferencing capability. That is, a number of parties can be effectively bridged together so as to be able to speak and listen to each other. While conferencing was a relatively easy task when dealing with analog audio signals, the ability to bridge together a number of digital voice channels is more complex. U.S. Pat. No. 4,267,593 discloses a two-port digital conference circuit and the problems attendant with digital conferencing. A multi-port conferencing circuit is disclosed in U.S. Pat. No. 4,257,120, in which numerous comparators and registers are required to determine a predominant voice sample to be distributed amongst the conferees.

Another problem attendant with the digital conferencing of a number of voice samples is that of controlling the volume of each channel. Generally, this has been addressed in the analog portions of the voice circuits where manual or automatic volume control can be utilized with relative ease.

In many of the foregoing telecommunication switching systems, and others, the flexibility to expand the system to accommodate additional users is limited. In other words, the growth capabilities are compromised, in that often it is necessary to purchase a system having the initial capability of servicing the number of user ports anticipated to be required in the future. The economic disadvantage of such a system is apparent. In other systems, modules can be added to the switching system as growth requirements dictate, however, certain central processing power must initially exist. The expandability of such type of systems has tradeoffs between initial cost and expansion capability.

It can be seen from the foregoing that a need exists for a communication system in which conferencing is simplified, in which there is not a limitation on the number of simultaneous conferences which can be carried on or the voice quality of the conference, and in which the volume of each channel can be independently controlled in the digital conference circuits.

SUMMARY OF THE INVENTION

In accordance with an important feature of the invention, there is disclosed a digital communication system having the capability of digitally controlling the volume of the various channels.

In the preferred form of the invention, each user port of the exemplary switching system is associated with a time division multiplex (TDM) time slot, and a conference circuit. Each digital conference circuit additionally includes a digital volume control circuit so that each TDM channel can be individually controlled as to its volume level, whether or not conferenced with the voice samples of other TDM channels.

The digital user port according to an important aspect of the invention includes a memory which can be programmed with a volume control parameter for each time slot of the system. If a volume level of a particular time slot is to be changed, then the memory location is dynamically reprogrammed with a different volume control parameter. The output of the volume control parameter memory defines a number of bits, which, when appended to the voice sample of the associated time slot, define a composite address for addressing a volume adjusted voice word memory. For example, if the volume control parameter memory provides a 4-bit output, then the voice word of the associated time slot can be varied to a maximum of sixteen different volume levels.

Essentially, the volume adjusted voice word memory has data stored therein such when accessed together with the four volume control parameter bits, a new digital voice word is retrieved which represents the desired amplitude. The output of the volume adjusted voice word memory is thus a new digital voice word having an amplitude of appropriate volume level.

For each digital voice word participating in a conference during its respective time slot, the volume adjusted voice word memory provides an 8-bit adjusted voice word to an accumulator circuit. The accumulator circuit includes a μ-law word adder memory and an 8-bit register. The accumulator is enabled only during those time slots where the associated voice words are to be conferenced together. The first volume adjusted voice word to be conferenced in the series of time slots is presented to the adder memory as an address. The register output is also input to the adder memory and appended as additional address bits thereto. The register is initially reset, and thus the first volume adjusted voice word and the register output define an address of the adder memory which yields an output of the first adjusted voice word itself. This adder memory output is stored in the register and presented back to the adder memory input as appended address bits. When the next volume adjusted voice sample to be conferenced occurs in its respective time slot, it is presented to the adder memory as an address, together with the first volume adjusted voice word output of the register.

The adder memory is accessed at a location which stores the sum of the first and second volume adjusted voice words. The sum output of the adder memory read from the adder memory is stored in the register. This accumulating action continues for each digital voice word to be conferenced in a frame interval. At the end of a frame interval, the register provides an output representative of all the volume adjusted voice words added together. The composite volume adjusted voice word is converted to an analog sample and filtered with other conferenced samples to define the conferenced voice signals.

Because the volume control parameter memory stores volume information for each time slot, and such information is utilized to modify the associated digital voice word, each voice word can be independently and dynamically changed with respect to the other voice words. If a volume change is to be carried out with a particular time slot or port, then only that memory location in the volume control parameter need be reprogrammed.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, elements or functions throughout the views, and in which:

FIG. 8 is a block diagram of a user port utilized in the system;

FIG. 9 is a detailed diagram of an outbound port interface between the user port and the TDM distribution bus.

FIG. 10 is a detailed diagram of an inbound port interface between the user port and the TDM collection bus;

FIGS. 13 and 14 are diagrams illustrating other embodiments of a communication system in which the invention can be practiced;

FIG. 16 is a flow chart depicting the programmed operations of the user port in carrying out changes in volume of the various channels;

FIG. 18 is a table illustrating the mapping of data in the volume adjusted voice word memory; and FIG. 19 illustrates an alternative technique for generating volume adjusted digital voice words.

DETAILED DESCRIPTION OF THE INVENTION

General

While the invention described below is particularly well adapted for use as on-premises communication equipment, the principles and concepts of the invention may be applicable to many other communication environments and utilizations. Also, those skilled in the art may find one or more features of the invention applicable to certain situations, without utilizing the other features.

Figure 1:
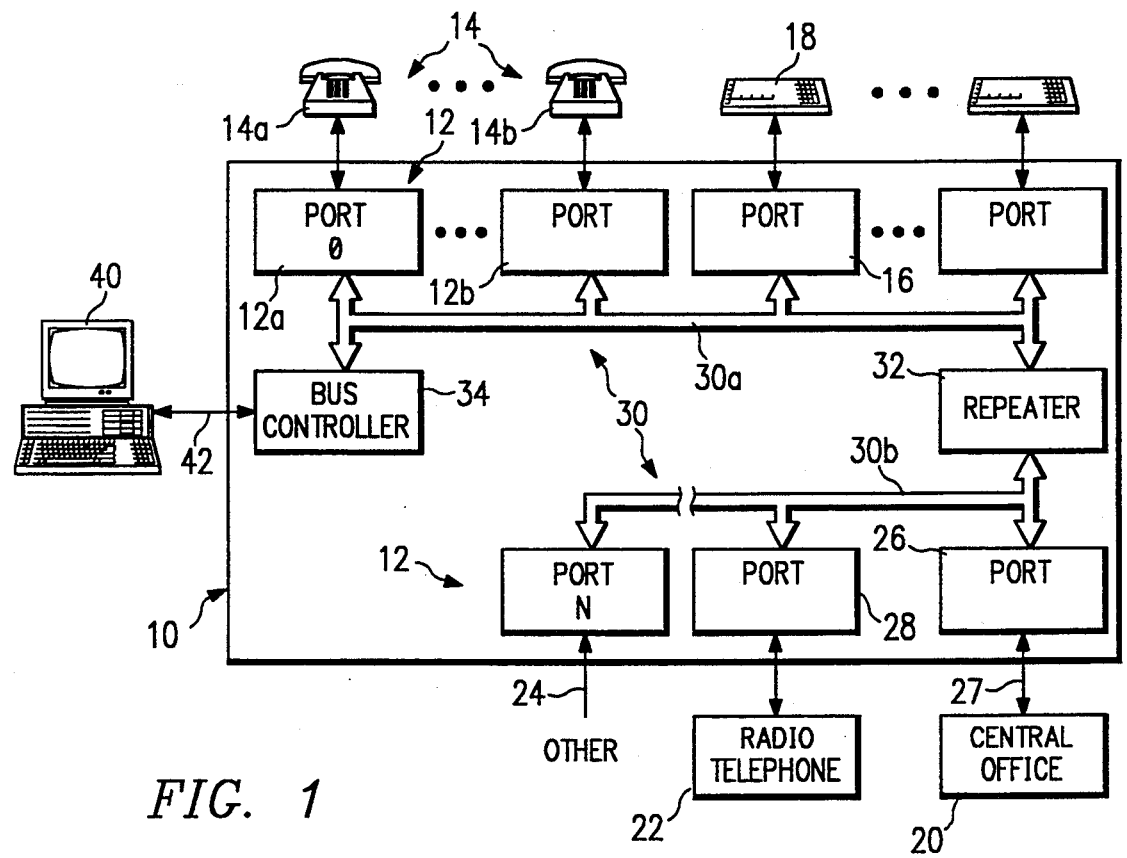
FIG. 1 is a generalized block diagram of a communications system in which the invention can be practiced.

With reference now to FIG. 1, there is illustrated the major functional blocks of the communication system 10 in which the invention may be advantageously practiced. Shown are a number of user ports, generally identified as reference character 12, which provide an interface between external subscriber equipment and the system 10. The basic structure of each user port 12 is substantially similar, except for interface circuits for connecting the different types of subscriber equipment to the system 10. For example, user ports 12a and 12b are adapted for providing an interface to a standard subscriber telephone set 14. A number of such ports can be utilized to accommodate a corresponding number of telephone sets 14. In this instance, the interface circuits in the user ports 12a–12b would be adapted for communicating audio sounds and tones and other signals to achieve conventional telephone communications. User port 16 is shown as an interface to an operator console 18. Again, the user port 16 would include interface circuits particularly adapted for communicating between the system 10 and the operator console 18. In particular, various other types of user ports can be provided for interfacing other telecommunications equipment, such as a central office 20, radio telephone equipment 22, as well as other communication facilities, shown by reference numeral 24. Various types of trunks 27 can be accommodated with the user port 26 for allowing connection of a central office switching system 20 to the communication system 10. In like manner, various other trunks or microwave facilities can be utilized to connect the radio telephone equipment 22 to the user port 28. Data channels, and integrated voice and data, such as ISDN, can be accommodated by the user ports of the invention. Generally, but not constituting a requirement, each user port is dedicated to a single subscriber set 14, console 18, trunk or other type of channel.

Each user port 12 is interconnected to the communication system 10 by a time division multiplex bus 30. As will be described in more detail below, the TDM bus 30 comprises a unidirectional collection bus and a unidirectional distribution bus. The signals carried in the various time slots of the TDM bus 30 are digital in nature, and thus can be transmitted only for limited distances. As a result, one or more TDM bus repeaters 32 can be provided to extend the bus 30a to additional similar buses 30b to service yet other user ports connected thereto. Each user port 12 has a dedicated time slot on the TDM buses 30a and 30b. In addition, each user port is processor controlled with a microprocessor in conjunction with operating software, circuits and tables to function independently of the other ports. One of the tables maintained in each user port 12 comprises a correlation between each user port and its associated time slot. In this manner, one user port can communicate audio information and data information with other ports by the interchange of data words in the respective time slots of the TDM bus 30.

The timing of the TDM bus 30 is provided by a bus controller 34. The bus controller 34 provides basic timing signals to each of the user ports 12 to synchronize each such port with regard to the time slots of the TDM bus 30. In practice, the timing signals and the voice words are carried on conductors of the TDM bus 30 so that the timing signals undergo the same delays as the voice words in the time slots. As will be described in more detail below, the bus controller 34 provides downloading capability of software and other data to each of the user port processors, provides status monitor and alarm conditions of the system, and importantly, provided resynchronization of the unidirectional TDM distribution bus with respect to the unidirectional TDM collection bus. For general non-complicated communication services, such as two-way telephone conversations, the user ports 12 can intercommunicate and establish such communications without the intervention of the bus controller 34. On the other hand, for more complicated communication services, the intervention of the bus controller 34 may be required to, for example, download conference lists, etc.

As noted above, the bus controller 34 can download software program information to each of the user ports 12. With this arrangement, the update of operating software does not require the changing of ROM-type memories in each user port 12, but rather only requires downloading of the updated information from the bus controller 34 to rewrite RAM memories in each user port 12. Only the ROM-type memories in the bus controller 34 require changing to implement new or modified versions of operating programs. The processor in bus controller 34 also maintains a data base which consists of directory tables, preset conference lists, call pickup group assignments, etc. This is maintained by the customer in a local or remote computer 40 and sent to bus controller 34 when changes are made. This data base is communicated by the bus controller 34 to the user ports 12 over the bus 30 when needed.

The generalized operation of the communication system 10 in carrying out a simple two-way telephone conversation is as follows. The bus controller 34 establishes the basic timing and framing intervals of the TDM bus 30. For example, the exemplary communication system 10 includes 1024 time slots on the TDM bus 30 for accommodating a total of 992 user ports 12, and 32 time slots used for system purposes as detailed below. The 1024 time slots occur in a framing interval of 125 microseconds, defining a sampling interval for the audio signals which are converted to digital voice words. The voice or audio signals of the user ports 12 are sampled 8,000 times each second. Each user port is assigned a dedicated time slot, as is the bus controller 34 itself.

The setup of a two-way conversation is initiated when, for example, a telephone set 14 goes off-hook and dials a directory number, or extension number, of another telephone set connected to the system 10. The user port of the off-hook telephone set consults a table to determine the time slot of the port associated with the called telephone set. Assuming for purposes of example, telephone set 14a is attempting to communicate with telephone set 14b, and port 12a is assigned time slot 50 and port 12b is assigned time slot 90. Then, the microprocessor of port 12a would insert a "wake up" status word in its time slot 50 on the TDM bus 30. Port 12b continuously monitors all time slots of the TDM bus 30 for the presence of a "wake up" word that specifies time slot 90. User port 12b will sense a wake-up status word in time slot 50, and thus it is known that port 12a desires communications with port 12b. In response, the processor of port 12b will insert in its time slot 90 an acknowledgement status word, which, when sensed by port 12a, completes a "hand shake" between the ports 12a and 12b. Port 12a then sends a "call request" message that is received by port 12b. This message is several bytes long and takes several frames to transmit, after the attention of port 12b has been obtained. Identical techniques are used for port 12b to send an "accepted" message if telephone set 14b is idle.

According to conventional telephone signalling techniques, the circuits of port 12b will ring telephone set 14b, and when answered, communications are established therebetween. Analog conversion circuits in ports 12a and 12b are effective to provide unidirectional transmit audio signals and unidirectional receive audio signals by way of hybrid circuits, and otherwise, that can provide corresponding digital words for transmission on the TDM bus 30. As will also be described in more detail below, the analog-to-digital conversion of voice signals is typically compressed or compounded according to A-law or μ-law standards from a thirteen-bit linear digital words to eight-bit coded voice words.

In any event, the processor controlled circuits in port 12a transmit digitized voice signals received from the telephone set 14a onto time slot 50 of a TDM collection bus of the bus 30, and receive digitized voice words from time slot 90 on a TDM distribution bus of the bus 30. In like manner, the processor controlled circuits of port 12b transmit in time slot 90 digitized voice information received from telephone set 14b on the TDM collection bus, and receive digitized voice words from time slot 50 on the TDM distribution bus. With this arrangement, ports 12a and 12b can provide two-way voice communications between telephone set 14a and telephone set 14b, without the active intervention of the bus controller 34 or any other type of central controller. Of course, the bus controller 34 provides the timing signals, but otherwise does not intervene in the establishing or the carrying out of the two-way communications described above. As can be appreciated, and as will be discussed below, data communications can be carried out instead of, or in addition to, voice communications in a similar manner. The basic type of handshake can also be carried out between the other user ports 12 which are connected to the operator consoles 18, the trunks of central offices 20, the communication links of radio telephone equipment 22 and any other type of telecommunication carrier or equipment, as denoted by numeral 24. Further, communications between any one of the user ports 12 can be established with the bus controller 34, as the bus controller itself has a dedicated time slot for communicating digital messages.

TDM Bus Structure

Figures 2, 3, 4:
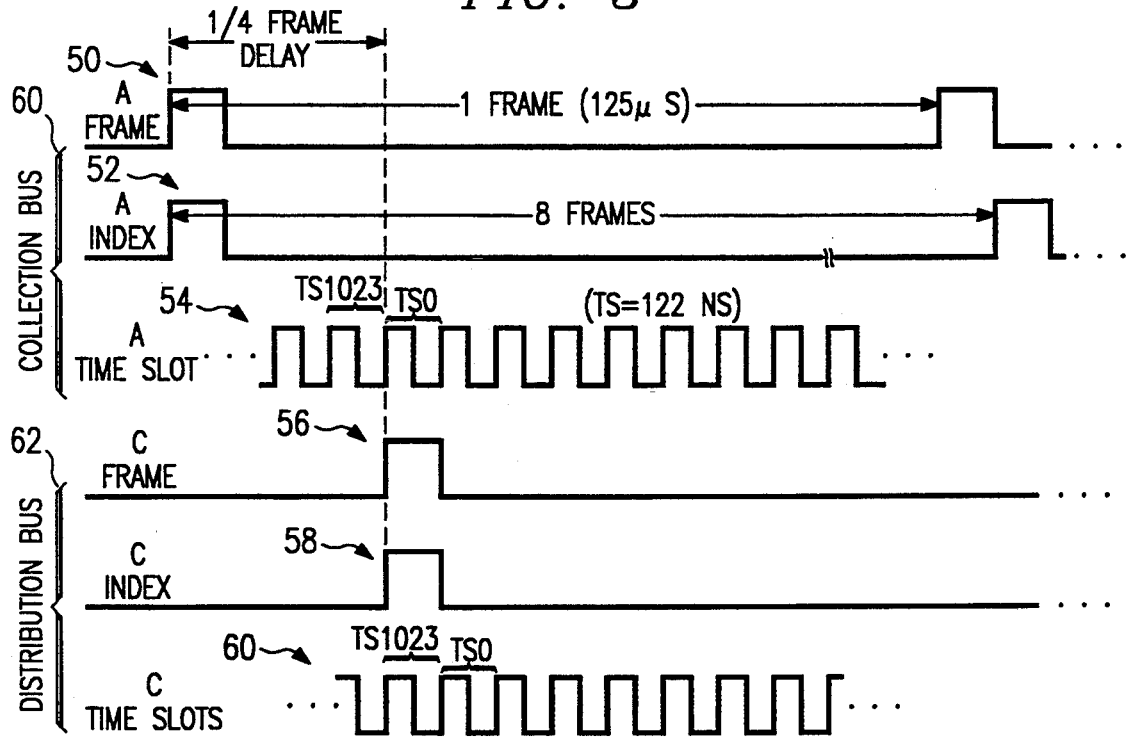
FIG. 2 identifies the utilization of the various bits of the parallel TDM buses with respect to the different bus cycles.
FIG. 3 is a timing diagram depicting the framing intervals of the TDM buses.
FIG. 4 identifies the functions carried out by various slots of the TDM bus.

FIG. 2 is a table which identifies the various conductors of either of the TDM collection bus or the TDM distribution bus, both such buses being duplicated for purposes of enhanced reliability. There are three other conductors which are routed with the fourteen conductors to carry clock signals, framing signals and frame index signals. The TDM collection and distribution buses each have 17-conductor buses routed between the various user ports in an equipment rack. Of course, the fourteen bus conductors can each carry logic signals in time slot intervals. In accordance with the preferred embodiment of the invention, each time slot interval comprises one hundred twenty-two nanoseconds to accommodate 1024 such intervals within a 125 microsecond framing interval. The digital signals are preferably of a 5-volt logic level, although other logic levels can be employed.

The signals on the various TDM bus conductors are utilized differently, depending upon the type of bus cycle being used by the port microprocessors. With reference to FIG. 2, there is shown a bus cycle utilized by the invention in the normal course of exchanging digital voice words between the user ports 12. When the TDM bus 30 is utilized in a voice cycle, as noted in FIG. 2, bits 0–7, comprising eight bits, are used in the voice bus cycle for carrying the eight bits of digitized voice information. Bits 8, 9 and 11 are in the digital low state, while the state of bit 10 is irrelevant (shown as an x) in the voice cycle. Bits 12 and 13 carry respective status and parity bit information, irrespective of the type of bus cycle.

The data cycle is similar to the voice cycle, with the exception that bit 8 is a digital high state, and bits 0–7 carry interport data messages rather than digitized and compressed voice information. Circuits in each user port 12 are sensitive to the state of bits 8–11, in that when a voice cycle is indicated, the digital signals of bits 0–7 are considered as voice information and, if received, are thereby processed and converted into analog form for further transmission to the telephone set, or other similar audio equipment. On the other hand, when a data cycle is indicated, data bits 0–7 are considered as raw data, and are processed as such, such as for port 12a to send a "call request" message to port 12b as described above.

A wake-up bus cycle employs bits 0–10 of the TDM bus 30, such cycle being uniquely identified with bit 11 being a digital high level. Accordingly, circuits in each user port 12 are sensitive to the detection of a logic high level in the bit 11 position, and thereby process bits 0–10 as port address information. The port address information specifies the destination user port to be interrupted, while the time slot in which such address appears identifies the source user port which initiated the destination port interrupt.

An executive wake-up bus cycle is uniquely identified with bit 11 of the TDM bus 30 being a logic low and the bit 9 being a logic high. The logic state of bit 0–8 and 10 are irrelevant in the executive wake-up cycle. Essentially, the latter mentioned wake-up cycle is employed by the bus controller 34 to interrupt all user ports to, for example, download directory information.

A parity bit is carried in each time slot on conductor position 13 of the TDM bus 30. The parity bit provides a conventional error checking mechanism for parity circuits in each user port 12. Parity checking circuits of conventional design can be employed in each user port 12 to compute even or odd parity, and thus determine the operational integrity of the digital signals transmitted during each frame interval. The status bit carried in position 12 of all fourteen conductors of the TDM bus 30 is transmitted during each time slot, and thus there is a status bit associated with each user port 12. Actual status information is conveyed by the communication system 10 in terms of 8-bit words, and thus for each user port 12, eight frames are required to realize a complete 8-bit status word.

The status bits are caught and maintained in each port 12 of the system on a continuous basis by dedicated hardware circuits in each such port. Each port thus has readily available the status of all the other ports. The status word of one port indicates BUSY, CALL FORWARDED, DATA CALL IN PROGRESS, RINGING OUT, and other status conditions. This is used by ports 12 of the system to make many call processing decisions without the need to send a message and wait for a reply. This mechanism substantially decreases data traffic within the system, and provides substantially faster setup of large conferences than would otherwise be the case. The status table can be consulted by the processor in a user port when, for example, initiating a call to another port. A translation is carried out between the extension number input by the calling party and the time slot of the destination user port. The identification of the user port can be cross referenced in the status table to determine if the destination port is idle or busy. If busy, further call processing need not be attempted, but rather a busy tone can be returned to the calling port by its processor without ever interrogating the destination port.

FIG. 3 illustrates the general timing waveforms characteristic of the time division multiplex bus 30. It should be understood that the duplicated TDM bus of the invention includes as pairs; an A collection bus and a C distribution bus, and a B collection bus and a D distribution bus. Waveform 50 comprises a framing pulse for defining a group of 1024 time slots on the A collection bus 60. The time slots are noted by waveform 54. As noted, within the 125 microsecond framing interval, there are 1024 time slots associated with each of the conductors shown in FIG. 2. Importantly, the time slots 54 on the TDM collection bus 60 are delayed with respect to the frame pulse 50 by about one quarter of a frame interval. To be describe more thoroughly below, such delay allows each user port 12 to assemble data and ready the port circuits for transmission when the assigned time slots are present on the TDM collection bus 60. The delayed time slot clock signal 54 is generated by the bus controller 34 and is coupled to each of the user ports 12 for purposes to be described below. Also shown is an index signal 52 which comprises a pulse aligned with various frame interval pulses 50, but occurring only once in every eight frames. Essentially, the index signal 54 defines a group of eight framing intervals for completing the transmission of a single 8-bit status word on TDM bus conductor number twelve.

FIG. 3 also illustrates the basic framing and time slots for the C distribution bus 62. As can be seen, the frame pulse 56 and the index pulse 58 are coincident with the first time slot (TSO) of the collection bus 60. The time slots 60 of the distribution bus 62 are not delayed with respect to the distribution bus framing pulses 56, but rather occur in a conventional timed manner. It is to be understood that the timing relation between the B collection bus 64 and the D distribution bus are identical to the waveforms shown in FIG. 3.

FIG. 4 identifies the allocation of the various time slots. While the time slots can be allocated as to function in an arbitrary manner, and can be varied to optimize the efficient communication function, the FIG. 4 allocation is believed to be well suited for providing full service telecommunication facilities as a PABX system. Preferably, the four time slots 0–3 are dedicated for use by the bus controller 34 to transfer data when downloading software programs to the various user ports 12. For example, when a user port 12 is initially installed in a card or module cage in the communication system 10, a software program is downloaded thereto by the bus controller 34. The software program will depend upon the type of user equipment connected to the port, as telephone set ports require different operating parameters than central office trunk ports. Nevertheless, user programs for each type of port in the system are maintained resident in the bus controller 34.

Time slot 4 is dedicated to a music-on-hold function which is available to each port 12 of the communication system 10. When, for example, a party has been placed on hold, the processor of the associated port can sense such condition, and retrieve the data in time slot 4 and couple the digitized music to a digital-to-analog converter for conversion into analog music signals. Such music signals can be transferred to the telephone set on hold in the usual manner.

Time slot 5 of the TDM bus 30 is dedicated to the processor of the bus controller 34. When the bus controller 34 is to communicate with other user ports 12 by way of the TDM bus 30, time slot 5 is employed to carry data messages. For example, when it is desired to establish a complicated conference with numerous ports, conference lists can be stored in the bus controller 34. Thus, when a user inputs information concerning such a conference call, and several digits identifying a particular conference list, such list can be requested and downloaded from the bus controller 34 to the appropriate user port 12.

Time slots 6–31 are each dedicated to a particular tone to thereby make available to every user port 12 in the communication system 10 all the typical telecommunication tones. The tones are continuously available in repetitive cycles in the respective tone time slots. In various time slots call progress tones can be transmitted to the user ports 12. Such call progress tones can comprise dial tones, busy tones, ring back tones, trunk busy tones, etc. The 16 DTMF tones are also available in respective tone time slots. Further, test tones such as warbles, 1 khz, 2.6 khz, and quiet tones are also available in respective tone time slots.

Disclosed in U.S. Pat. No. 4,205,203 is a tone generator for producing numerous telecommunication tones, and particularly adapted for operating in a TDM type of system. The disclosure of such patent is incorporated herein in its entirety by reference thereto.

Time slots 32–1023 are dedicated to respective user ports 12 of the communication system 10. While not all user ports 12 may be needed or required by a particular configuration of the communication system 10, up to 992 such time slots are available in this embodiment for servicing a corresponding number of user ports 12. By uniquely dedicating each one of the time slots 32–1023 to respective user ports 12, appropriate tables can be maintained resident with each user port 12 to determine which time slot to utilize for communicating with any other user port. As is well known in other communication systems employing TDM buses, the time slot assignments are transient in nature, and are maintained only for the duration of the particular telephone call. In such a situation, a central controller maintains the status of the time slot assignment for the duration of each call, which can present obvious hardware and software burdens, like continuous management of the time slots with respect to all the telephone calls.

Figure 5:
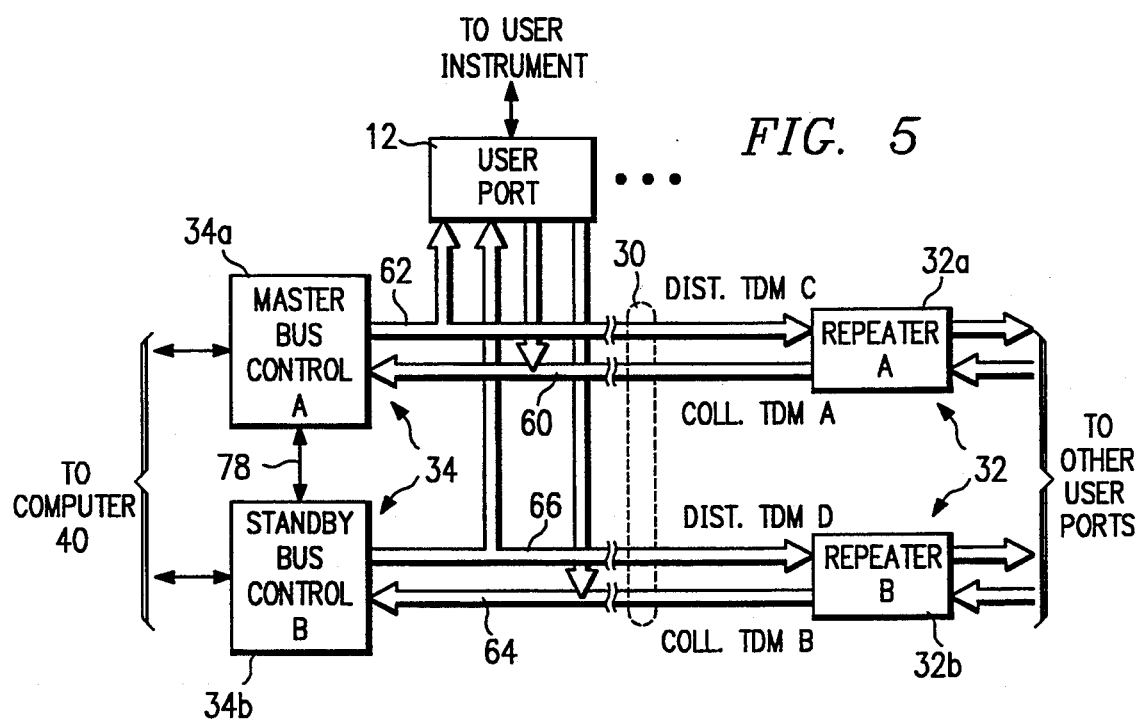
FIG. 5 is a diagram of the duplicated TDM bus system to which the user ports are connected.

With the foregoing in mind, reference is made to FIG. 5 where there is illustrated the TDM bus structure utilized by the switching system. Such figure illustrates a single user port 12 connected to the TDM bus 30, it being understood that many more user ports would typically be connected to the bus in a similar manner. The TDM bus 30 of the invention includes a 17-conductor TDM A collection bus 60 (with timing signal conductors) and a similar 17-conductor TDM C distribution bus 62. For purposes of reliability, such buses are duplicated as respective B collection bus 64 and D distribution bus 66. Associated with the A collection and C distribution buses 60 and 62 is a master bus controller 34a. In like manner, a standby bus controller 34b is associated with the B collection and D distribution buses 64 and 66. Each user port 12 includes an inbound interface for connection to each TDM collection bus 60 and 64, as well as an outbound interface associated with each TDM distribution bus 62 and 66.

In practice, each user port module has fixed on its back connectors pluggable into other connectors of a backplane of a module cage. The backplane is a multilayer printed circuit board with printed wire paths defining the four 17-bit TDM buses. With this arrangement, if the master controller 34a and collection/distribution bus pair 60 and 62 become defective, the other duplicated bus equipment can be automatically employed to continue communication services.

Because high speed digital signals are carried on the TDM bus 30, the driving capabilities thereof are limited to a prescribed distance. Hence, a pair of repeaters 32a and 32b can be provided for reshaping and resynchronizing the signals for transmission additional distances. A single pair of bus controllers 34a and 34b are provided in one of many equipment shelves housing the user ports 12. Each shelf of the bay has a repeater 32 for driving the user ports connected within such shelves. In this manner, numerous different equipment shelves of user ports can be simultaneously driven so that all such ports maintain synchronized communications within the various time slots. Repeater circuits for carrying out such functions on digital signals are well known to those skilled in the art.

As can be appreciated from FIG. 5, voice or data words transmitted from each user port 12 is by way of backplane connectors to the respective TDM collection buses 60 and 64. Digital information received by each user port 12 is by way of connectors from the respective TDM distribution buses 62 and 66. Therefore, in order to provide a bi-directional communication link between two or more ports, a unidirectional TDM collection bus and associated unidirectional distribution bus are employed. Each bus control circuit 34a and 34b include a "U-turn" circuit for receiving data samples on the collection TDM bus, resynchronizing such data samples, and driving them back to all of the user ports 12 on the distribution TDM bus 62. This technique allows each user port 12 of the communication system 10 to make available at all times voice and control data signals originating from any of the other user ports.

It is to be noted that only one bus controller 34a or 34b is online at any one time, one being a master and one being a standby, as identified in FIG. 5, or vice versa. The master or standby status of the bus controllers 34a and 34b can be changed manually by front panel buttons, or automatically on the detection of a system fault. In addition, each bus controller 34a and 34b maintains updated operating software, call processing tables, etc. so that if placed online, normal communications can continue without intervention. To that end, a data link 78 is interconnected between the bus controllers 34a and 34b to provide serial data communications therebetween for updating purposes. For example, if bus controller 34a is presently online as a master, and if a table or program software therein is updated via the computer 40, such update is subsequently transferred by the master bus controller 34a to the standby bus controller 34b, via the data link 78. The reverse operations will occur should bus controller 34b be the online bus controller, and 34a remain in a standby status.

Bus Controller

Figure 6:
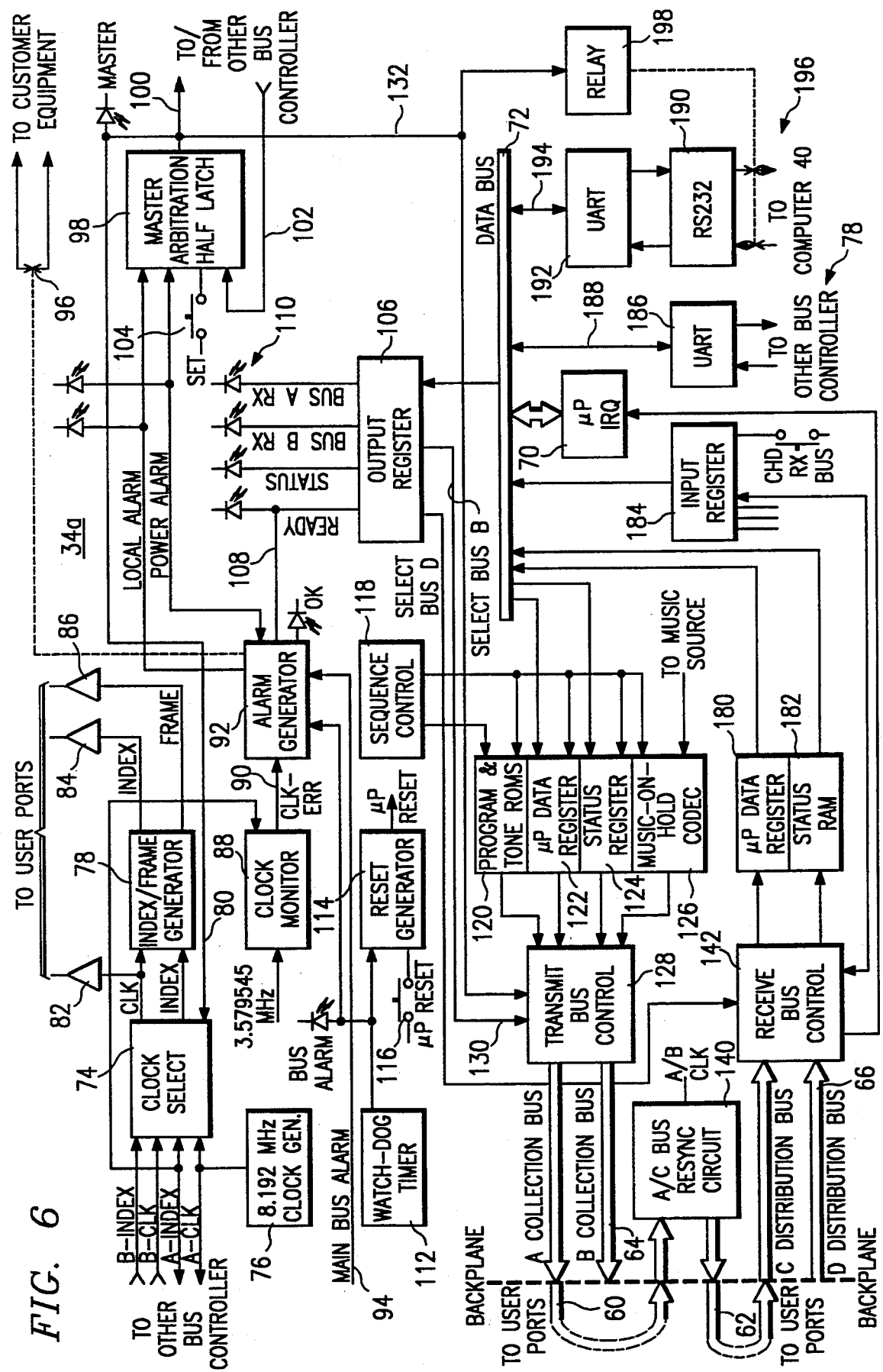
FIG. 6 is a detailed block diagram of a bus controller of the system.

With regard to FIG. 6, one bus controller, controller 34a, is illustrated in detailed block diagram form.

According to the preferred embodiment of the invention. It is to be understood that the other bus controller 34b is constructed in an identical manner so as to be functionally interchangeable and pluggable into one or the other of the card shelve slots allocated for the bus controllers. While not shown, and as noted above, right and left printed circuit board connectors are soldered in a backplane so that the bus controller is interconnected to the duplicated TDM buses 60–66, as well as connected to each other and the computer 40. Also as noted above, the bus controller 34 generates timing signals which are carried with the TDM bus wires to each user port 12 of the communication system 10.

With specific reference to the various circuits of the bus controller 34a, there is shown a microprocessor 70 which services a bi-directional data bus 72 for communicating data information to and from the various circuits of the bus controller 34a. The microprocessor 70 can be of a conventional type, such as an 8-bit microprocessor having sufficient on-board random access memory to carry out the functions described below. The bus controller 34a further includes a clock select circuit 74 which selects whether the bus controller 34a will output clock signals generated therein, if it is master bus controller, or synchronize with the clock signals of the other bus controller 34b if such other bus controller 346 is the master. A 8.192 Mhz clock generator 76 generates clock signals which are input to the clock select circuit 74 of the bus controller 34a, as well as coupled to the other bus controller 34b. In like manner, an index/frame generator circuit 78 generates index signals which are coupled back to the clock select circuit 74, as well as to the other clock select circuit in the other bus controller 34b. Index and clock signals from the other bus controller 34b are coupled to the clock select circuit 74. The selection of the clock and index signals by the clock select circuit 74 is governed by the logic state on conductor 80, which function will be described below. The clock select circuit 74 provides an output clock signal which is buffered by a driver 82 and distributed to each of the user ports 12 with the TDM bus 30. The clock signal is substantially the same as that shown as reference character 54 in FIG. 3. The index/frame generator 78 receives clock signals as well as index signals, and produces corresponding index and frame output signals. The index/frame generator 78 includes counters and associated circuits for generating the index and frame pulses from the clock pulse signal. As with the output clock signal, the index and frame signals are buffered by corresponding drivers 84 and 86. It should be noted that the first bus controller 34a drives the TDM A collection and C distribution buses associated therewith with the locally derived clock signals. On the other hand, the second bus controller 34b, when functioning as standby, maintains synchronization with the master bus controller 34a, and drives its associated TDM B collection and distribution buses in a synchronous manner. The master and standby buses thereby operate synchronously with respect to the time slots so that switchover can be accomplished without loss of coordination or timing of the various time slots. Basic synchronization between the master and standby bus controllers is afforded by the index clock pulse output by the generator 78. Also, the backplane connectors of the bus controllers 34a and 34b are interconnected so that if either bus controller module is inserted into the left connector, such module will drive the TDM A collection bus, but if plugged into the right-hand connector, such module will drive the TDM B collection bus. The clock signal driven by the buffer 82 is coupled to each user port to synchronize such ports with the time slots of the collection TDM bus.

A clock monitor 88 receives a 3.579545 Mhz clock signal as one input, and the A-index signal as another input. This input of the clock monitor 88 comprises a standard color burst frequency conventionally utilized in the color televisions. The clock monitor 88 essentially counts the number of 3.579545 MHz pulses occurring within a one millisecond period between two index pulses. If the correct number occurs, then the bus controller 34a is allowed to continue operation. On the other hand, if this criterion is not met, a clock error signal is generated on clock monitor output 90 for triggering an alarm generator 92. The alarm generator 92 generates various visual and electrical alarms utilized by other circuits of the bus controller 34a. In addition, the alarm generator 92 monitors power supply circuits as well as other circuits of the bus controller 34a for generating the appropriate alarms and providing a controlled shutdown of the controller 34a, should circuit malfunctions be detected. The alarm generator 92 can receive a main bus alarm input 94, and provide closure of a set of relay contacts 96 for alerting customer or other equipment of the alarmed condition.

In order to also coordinate the on-line operation of one or the other of the bus controllers 34, a master arbitration half latch 98 is provided. Essentially, the circuit 98 comprises one half of a set-reset flip-flop, the other half being in the other bus controller 34, and connected by conductors 100 and 102 thereto. When both bus controllers 34a and 34b are plugged into the appropriate backplane connectors of the communication system 10, both half latches operate as a single cross-coupled flip-flop, thereby providing opposite digital states to each bus controller. In this manner, one digital state determines the master status of one bus controller, and the other digital state controls the standby status of the other master controller. However, and in accordance with an important feature of the invention, should one bus controller be removed from the backplane connector, the half latch 98 in the remaining bus controller assumes the appropriate digital state to force the remaining controller to assume a master bus controller status, if it does not have any alarm conditions. Therefore, the half latch circuit configuration allows the operation of only a single master bus controller when both such modules are active within the backplane connectors, and in addition, a master status is assumed by the bus controller remaining in the backplane should the other be removed. A front panel switch 104 is provided with each bus controller module so that when manually operated, absent alarms, master status can be achieved. Various conductors from the alarm generator 92 are also connected to the half latch circuit 98 so that the master-standby status of a bus controller can be automatically changed, should an alarm condition occur. Also as noted in FIG. 6, the microprocessor 70 is connected by way of an output register 106, and therethrough by conductor 108 to the alarm generator 92. Hence, the microprocessor 70 can be programmed with various diagnostic routines and other circuit sensors to sense malfunction of the circuits and thereby control the master-standby status of the bus controller 34a. A number of visual indicators 10 are connected to the output register 106 to yield a visual indication of the operational status of each bus controller 34a and 34b.

As noted above, the master arbitration half latch circuit 98 is connected by conductor 80 to the clock select circuit 74 to allow selection between the various signal inputs to such circuit 74. In other words, should bus controller 34a be presently designated as a master, as determined by the state of the half latch 98, then the clock select circuit 74 will be controlled to select clock signals, frame and index pulses, generated locally by the generator 76. On the other hand, if bus controller 34a is presently a standby bus controller, then the clock select circuit 74 will be controlled, via input 80, so that its timing signals are synchronized by the B-clock signal and the B-index signal generated by the other bus controller 34b, in connection with its master status.

A watch dog timer 112 provides an input to the alarm generator 92, as well as an input to a reset generator 114. The reset generator 114 is responsive to either input from the watch dog timer 112, or a panel-mounted reset switch 116, for generating a microprocessor reset signal.

A sequence control circuit 118 is connected to a number of other circuits for inserting associated bits into various time slots of the TDM collection bus. To that end, the sequence control circuit 118 is connected to program and tone ROM 120, a microprocessor data register 122, a status register 124, and a music-on-hold codec 126. The respective outputs of such circuits are connected to a transmit bus control 128 which can transmit on the A collection bus 60 or the B collection bus 64. The transmit bus control 128 is connected to the output register 106 by a control conductor 130. The microprocessor 70 can output data to the output register 106 so as to control whether the transmit bus control circuit 128 derives timing from the A collection bus, or from the B collection bus, for the purpose of transmitting data on both such buses. The transmit bus control 128 is also connected to the master arbitration half latch 98 by a conductor 132 for providing appropriate control.

The program and tone ROMs 120 include adequate storage space for storing the operating program for each of the user modules 12. In addition, memories are providing for storing digitized samples of various call progress tones, DTMF tones, test tones, etc. utilized by the communication system 10. While not shown, the sequence controller 118 is synchronized with the A-clk signal so that program data and digitized tone samples can be inserted into the appropriate time slots and transmitted by the transmit bus control circuit 128 onto both collection buses. As noted above, time slots 0–3 are dedicated to the downloading of data from the program ROMs 120 and transmittal to the user ports 12. In addition, time slots 6–31 are dedicated to the transmission of various tones, as read from the tone ROMs 120. The sequence control circuit 118 is configured to continuously transmit the operating program data and the various tones in their respective time slots.

As noted above, the microprocessor of the master bus controller 34 can communicate with the user ports 12 by way of a dedicated time slot, namely time slot number 5. The microprocessor data register 122 is adapted for coupling data from the microprocessor 70 to the transmit bus control 128 to accomplish such communication. In order to transmit data, such as conference lists, and the like, the microprocessor 70 loads such information into the data register 122, and the sequence control 118 then downloads such data sequentially into time slot number 5 for transmission on the collection bus by the transmit bus control 128. The data register 122 can comprise a parallel-in, parallel-out type of shift register, or other arrangement of storage circuits.

The contents of the status register 124 are transmitted on TDM conductor twelve in time slot number five, as noted in FIG. 2. Like the data register 122, the microprocessor 70 can load the status register 124 with status information for transmission by the transmit bus control 128 on the collection bus. As noted in FIG. 6, the microprocessor data register 122 and status register 124 are connected to the microprocessor data bus 72.

The music-on-hold circuit 126 receives analog music signals as an input, and converts the same by conventional codec circuits into compressed digital words for transmission in time slot 4. Time slot 4 is dedicated to the continuous transmission of the digitized music. As with the other circuits, the circuit 126 is controlled by the sequence controller 118 for supplying the digitized music information in time slot 4.

The transmit bus control 128 has a pair of 14-bit output buses, namely the A collection bus 60 and the B collection bus 64. When the bus controller 34a is master, its transmit bus control 128 causes transmission of all the above mentioned information onto both the A collection bus 60 and the B collection bus 64. Should bus controller 34a not be currently designated as master, then its transmit control 128 inhibits it from transmitting anything onto either of the two collection buses.

Each user port 12 is connected to both the A collection bus 60 and the B collection bus 64 for transmitting data thereon, voice words, etc. in their respective time slots. The A-collection bus 60 terminates with an A/C bus resynchronization circuit 140 in bus controller 34a. The B collection bus 64 transmits with a B/D bus resynchronization circuit 140 in bus controller 34b. The resynchronization circuit 140 resynchronizes the data in each time slot of its respective collection bus and retransmits the same on its respective distribution bus. The configuration shown in FIG. 6 is depicted as plugged into a left-hand backplane slot, and thus the bus resynchronization circuit 140 transmits on the C distribution bus 62, and the TDM signals are received thereon by a receive bus control circuit 142. When plugged into a right-hand backplane slot, the bus resynchronization circuit 140 would transmit TDM signals which would be received by the bus controller 34b on the D distribution bus 66. Again, all user ports 12 receive data, voice words, etc. transmitted from the other ports, or from the bus controller 34 itself, on both the C or D distribution buses 62 or 66.

Figure 7:
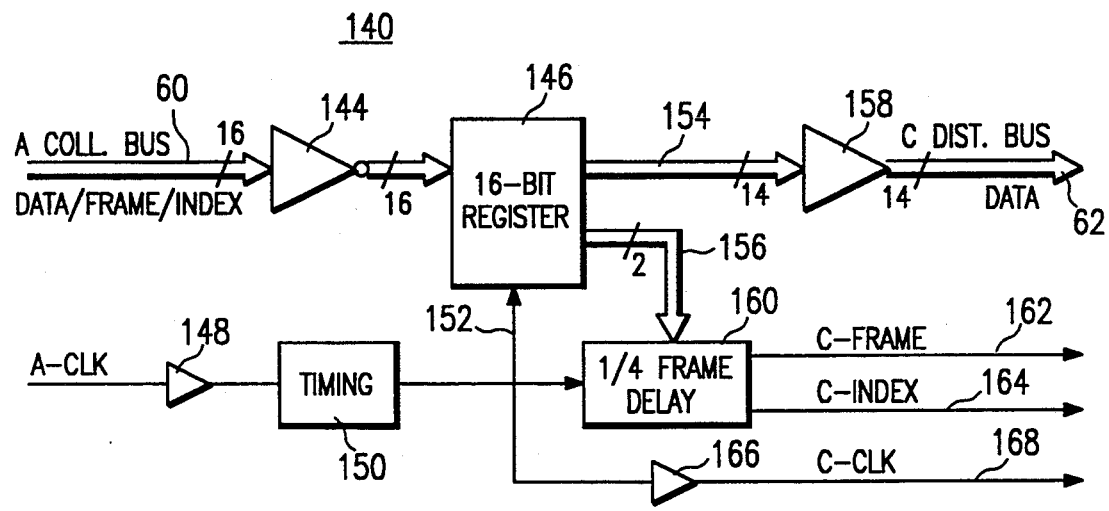
FIG. 7 is a schematic circuit diagram of a bus resynchronizing circuit which connects to a TDM collection bus to a TDM distribution bus.

With reference to FIG. 7, there is shown the bus resynchronization circuit 140 in more detail. The bus resynchronization circuit 140 includes a number of logic Schmitt inverters 144 for inverting the signals carried by each of the fourteen time slot conductors of the TDM bus (FIG. 2), as well as the frame and index pulses. All sixteen parallel bits are temporarily stored in a 16-bit register 146. The A-clk signal is buffered by a buffer 148 and is delayed appropriately by a timing circuit 150, the output of which is coupled to the register 146 for latching the 16-bits. The extent of the delay is generally that which occurs as a result of the distributed capacitance of the collection bus. The timing circuit 150 essentially comprises one or more gate delays so that the latch input signal 152 of the register 146 has a rising edge occurring about the midpoint with the sixteen bits of input. While various of the sixteen bits may be misaligned due to jitter, non-uniform delay, and otherwise, such bits are latched into the register 146 and again outputted simultaneously, thereby removing any instability, jitter or differences due to non-uniform delay. The output of the register 146 includes fourteen data bits, as well as two signaling bits, defining the frame bit and the index bit. The fourteen data bits on bus 154 are buffered with a corresponding number of buffer-drivers 158 and retransmitted on the C distribution bus 62.

The frame and index signals output by the register 146 on the bus 156 undergo a delay contributed by the delay circuit 160. The delay circuit 160 is essentially a counter which counts at the A-clk clock rate and repeats input pulses about 256 counts later. Since the number 256 is one-fourth of the number of times slots in a frame, the frame and index pulses undergo a quarter frame delay. The quarter frame delay circuit 160 provides a C-frame and a C-index signal on respective conductors 162 and 164, which conductors are routed along with the C distribution bus 62 to each of the user ports 12. The slightly delayed A-clk signal is buffered with a driver 166 and reproduced as a C-clk signal on conductor 168, also routed along with the other TDM data signals and framing signals. It should be understood that the other bus controller 34b plugged into the other shelf slot includes a similar circuit for receiving B collection bus 64 data and timing signals, and for producing corresponding D distribution bus and timing signals.

Reference is made back to FIG. 3 where there is illustrated the collection bus timing signals and the delayed distribution bus signals resulting from the bus resynchronization circuit 140.

The quarter frame delay noted in FIG. 3 is related to the time required for each user port 12 to carry out an internal coordination to gather appropriate data and present the same for transmission in its assigned time slot of the collection bus 60 or 64. Once each user port 12 receives a framing pulse 50, data information is required about 31 microseconds (¼ frame) after the passage of a number of clock pulses equal to the physical port number of respective user port 12. This ensures that each user port 12 transmits its data or voice, etc., in that the slot having the same number as the physical position of that particular port 12 in the system 10.

The timing concern between the framing pulse and the time slots is not a concern with respect to the distribution bus, as also shown in FIG. 3. Here, the framing pulse 56 is coincident with the initial time slots, thus eliminating any requirement for a delay. This can be appreciated as each user port 12 can quickly retrieve data from the various time slots of the TDM distribution bus by hardware circuits, without advance preparation. Accordingly, the timing of the distribution bus with respect to frame timing and the time slots is generated in a traditional manner.

With reference again to FIG. 6, the receive bus controller 142 has a pair of outputs, one coupled to a microprocessor data register 180 and the other coupled to a status memory 182. The output of the data register 180 and the status RAM 182 are connected to the microprocessor data bus 72. The receive bus control 142 has a control input from the output register 106 for selecting whether to receive data from the C distribution bus 62 or the D distribution bus 66. Further, the receive bus control circuit 142 has an output connected to the microprocessor 70 for interrupt purposes. When data is to be received from one of the user ports 12, such data is received by the bus control circuit 142 and stored in the data register 180, whereupon the microprocessor 70 is interrupted. After the receive bus control circuit 142 has transferred the data to either the data register 180 or the status RAM 182, the microprocessor 70 can retrieve such information via the data bus 72. The receive bus control circuit 142 continuously monitors the status bits carried by the TDM distribution bus conductor number twelve, and stores such information in the status RAM 182. The microprocessor 70 can thus receive both data information as well as status information of the current status of each of the user ports 12 of the communication system 10.

Parity information is also retrieved from the parity conductor (number thirteen) of the TDM bus 30 and transferred from the receive bus control circuit 142 to an input register 184. The input register 184 is connected to the data bus 72 for coupling data information to the microprocessor 70. The input register 184 also has one or more input switches, one of which may be a panel-mounted switch for changing the active receive bus to the bus controller. The input register 184 can also have a number of switch inputs to determine the baud rate of transmission of asynchronous transmitting and receiving circuits described below. Further, the input register may have an input from the other bus controller so that the microprocessors can intercommunicate by way of the respective input registers 184.

A first universal asynchronous receive transmit (UART) circuit 186 has a bi-directional bus 188 connected to the microprocessor data bus 72. The unidirectional serial receive and transmit output buses 78 are connected to the other bus controller. The bus controllers 34a and 34b can thus communicate with each other via the serial asynchronous link 78 to, for example, download directory table updating and tabular information from one bus controller to the other.

A second UART 192 is connected by unidirectional, serial receive and transmit conductors to an RS232 port 190. The second UART port 192 is connected by a bi-directional bus 194 to the microprocessor data bus 72. The serial outputs of the RS232 port 190 are connected through relay contacts 196 to the computer 40. With this arrangement, the computer 40 can download operating program software and other data to the master bus controller 34a. The operation of contacts 196 are controlled by a relay 198 which is, in turn, controlled by the master arbitration half latch 98. In other words, the relay 198 can only be operated by the bus controller which is presently a master, and therefore the computer can only communicate with a master bus controller. Information and data transferred from the computer 40 to the standby bus controller can only be accomplished through the intermediate transfer occasioned by the microprocessor 70 of the master bus controller. Of course, the master bus controller can transmit data to the computer 40 by way of the serial transmit bus output by the UART 192.

User Port

FIG. 8 illustrates in block diagram form a user port 12. The particular type of user port illustrated is employed in connection with a telephone subscriber set 14. The user port 12 includes an outbound port interface 210 connected to the duplicated TDM distribution buses 62 and 66. In like manner, an inbound port interface 212 is connected to both of the TDM collection buses 60 and 64. A subscriber instrument interface 214 includes conventional telephone circuits for communicating voice and telephone signaling information to a subscriber set 14. The subscriber instrument interface can include subscriber line power and ringing circuits, off-hook detectors, hybrid circuits and other conventional circuits enabling the user port 12 to communicate with the telephone subscriber set 14. When user ports 12 are used in conjunction with other subscriber instruments, such as mobile radios, operator consoles and other switching apparatus such as central office trunks, different subscriber instrument interfaces may be required, or tailored to interface with the particular external communication equipment.

A microprocessor and associated circuits 216 is utilized in each user port 12 to control the operations of all the circuits thereof to carry out overall telecommunication functions. Digital control logic 218 is included in each user port 12 for receiving various control and address bits from the distribution bus, and transmitting other control bits to the collection buses, as well as control a conference circuit 220. The digital control logic 218 also communicates with the microprocessor circuits 216. The microprocessor in the circuit 216 can thus maintain status of the user port 12, as well as the other user ports to facilitate the coordination of communications therewith. Importantly, the microprocessor circuits are active in initially setting up a telephone call, but thereafter the high speed logic circuits process and direct the time slot information to and from the user port 12.

The flow of digital voice words from the port interface circuits 210 and 212 is carried out as follows. In providing standard two-way telephone conversations, the outbound port interface 210 selects 8-bit voice words from the time slot a selected of one of the distribution buses 62 or 66. The selected voice words are transmitted via an internal 8-bit bus 222 to the conference circuit 220. For two-way telephone conversations, the voice words proceed unchanged through the conference circuit 220 and are carried by the 8-bit internal bus 224 to the subscriber instrument interface 214. In the subscriber interface 214, the digital voice words are converted to analog samples and are applied through a filter network with other serial samples to form a representative analog waveform. The analog signal is transferred through other circuits of the subscriber instrument interface 214 to the earpiece of the telephone set 14. Of course, the digital control logic 218 maintains the user port 12 timed with respect to the time slots on the TDM buses so that voice words can be retrieved from and transmitted on the various TDM buses 30. The microprocessor circuits 216 are programmed to initially control the setup of the telephone call or conference and to maintain overview of the status of both the destination telephone set, as well as the telephone set 14 connected to the port 12, or home port. The microprocessor circuits 216 can also control the subscriber instrument interface 214 to establish audio transmission or to cause ringing to, or to detect off-hook conditions of the telephone set 14.

Audio information input into the mouthpiece of the telephone set 14 is converted by analog-to-digital converters in the subscriber instrument interface 214 with codecs which are similar to circuit 126 of FIG. 6. For telecommunication purposes, the analog voice signals from the telephone set 14 are generally digitized according to $\mu$-law or A-law nonlinear formats. In any event, the nonlinear 8-bit voice words are output by the subscriber instrument interface 214 on bus 226 to the inbound port interface 212. Parity is computed over the bits by circuits in the inbound port interface 212, and status bits are also added to the bitstream and driven onto the A and B TDM collection buses 60 and 64.

In synchronizing the user port 12 with respect to the TDM bus 30, clock and frame signals are coupled by bus 228 from the outbound interface 210 to the high speed digital control logic 218. As noted above, the digital control logic communicates with the microprocessor circuits 216 by way of the bi-directional bus 232 which carries parallel control bits. Parallel control bits are also transmitted from the digital control logic 218 on bus 234 to each port interface 210 and 212. Parallel port status and port address bits are transmitted from the microprocessor circuits 216 to the inbound port interface 212 on bus 236.

It should be noted that the microprocessor circuits 216 include a sequence control circuit 118 and associated microprocessor data registers 122, status registers 124 and transmit bus controllers 128, similar to that shown in the bus controller in FIG. 6. In addition, the microprocessor control circuits 216 also include a receive bus controller 142 and data register 180 and status RAM 182, also similar to that shown in FIG. 6.

With respect to FIG. 9, there is shown a more detailed illustration of the outbound port interface 210 of the user port 12. Such interface includes a number of Schmitt-type buffers 240 for buffering the C distribution bus 62 before input to a 2:1 multiplexer 242. The D distribution bus 66 also has Schmitt-type buffers 244 before being input to the other input of the multiplexer 242. The buffered interface prevents logic circuit malfunctions in the interface from affecting the bus and thus preventing the other user ports form using the bus. The selected output of the multiplexer 242, comprising a 16-bit signal, is latched into a register 246. The output of the register 246 comprises internal bus 222 for carrying the voice data bits and the frame synchronizing signals. The C-clk and D-clk signals are buffered by respective buffers 248 and 250 before being input to a 2:1 multiplexer 252. The output of the multiplexer 252 comprises a clock signal for the user port 12. The clock signal is also effective to provide the latching signal for the 16-bit register 246. The selection of one or the other of the inputs of the multiplexers 242 and 252 is controlled by the digital control logic 218.

FIG. 10 illustrates in block form the functional circuits of the inbound port interface 212. Voice words output from the subscriber instrument interface 214 are carried by the bus 226 to a pair of parity generators 260 and 262, the output of which is a parity bit for transmission with the voice words over the TDM collection buses 60 and 64. Parallel control bits carried on bus 234 are processed similarly. More specifically, the voice words are coupled on the internal bus 226 to one register/driver 264, and therefrom to the A collection bus 60. Voice words are also coupled by internal bus 226 to a second register/driver circuit 266 which drives the B collection bus 64. Status bits are coupled from the microprocessor circuits 216 to both parity generators 260 and 262, and to both register/drivers 264 and 266 on the bus 236.

Conference Circuit

Figure 11:
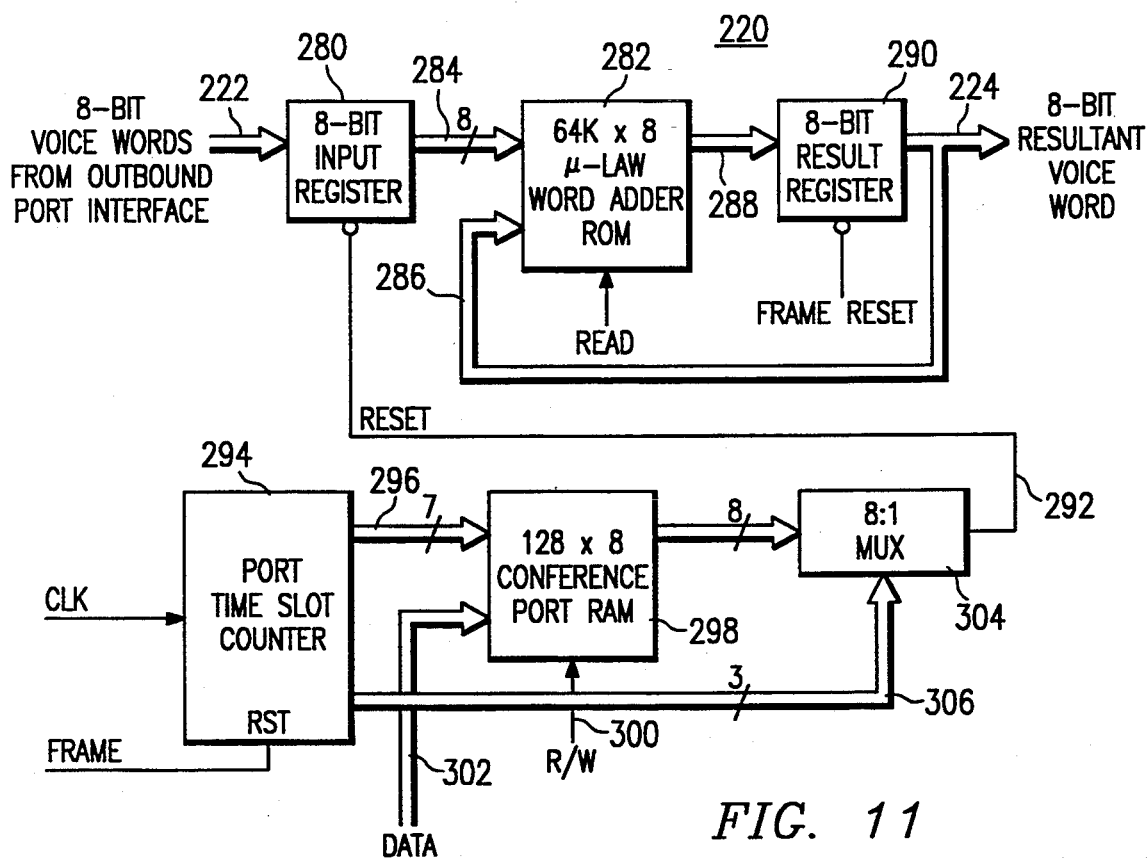
FIG. 11 is a schematic circuit diagram of a memory circuit for summing a number of compressed audio words.

In FIG. 11 there is shown a detailed block diagram of the conference circuit 220 as utilized in each user port 12. Although the conferencing technique of the invention can be embodied in a number of different types of circuits, the preferred form includes an 8-bit register 280 for receiving 8-bit voice words from the outbound port interface 210. The eight bits of each word are temporarily latched in the register 280 and then presented to a read only memory 282. The read only memory is programmed to store the sum of any two 8-bit voice word addends presented to its two 8-bit inputs. A first 8-bit input is presented to the memory 282 on bus 284, while a second 8-bit input is presented on bus 286. The two 8-bit words presented to the memory 282 comprise a 16-bit address which defines a unique location having stored therein the sum of the two address words to be added.

Importantly, the read only memory 282 is programmed to store the summed results of two $\mu$-law voice words so that the memory output also complies with the $\mu$-law compression format. Since the voice words carried by the communication system 10 are eight bits in length, the addition of any two 8-bit words yields a total combination of words equal to 64K. Those skilled in the art can readily derive programming techniques for generating the summed results of any two 8-bit $\mu$-law compressed words, for programming the read only memory 282. The summed results of A-law compressed voice words can also be derived and stored in the read only memory 282, should A-law compression techniques be utilized in the communication system 10.

The memory 282 provides an 8-bit output on bus 288 to an 8-bit result register 290. The result register 290 temporarily stores the memory readout and presents such readout as an 8-bit resultant voice word on bus 224, as well as an 8-bit word coupled back to one address input of the memory 282 on bus 286.

The 8-bit input register 280 is reset by a signal on line 292 at the TDM bus time slot rate. The result register 290 is reset at the beginning of each frame to a predefined state which represents a zero voice level according to the $\mu$-law format. To that end, the input register reset signal circuits include a port time slot counter 294. The counter 294 provides a unique 10-bit output for each time slot, seven bits of which are carried by bus 296 to a conference port RAM 298. Prior to the initiation of each conference telephone call, the conference port RAM 298 is written with data by the port microprocessor 216. The data written constitutes a single bit for each port to identify which time slots are involved in a conference, and which time slots are not. Preferably, memory locations in the conference port RAM 298 are written with a logic one bit in those locations with associated time slots to signify the participation in a conference. A logic zero will be written into the memory locations associated with time slots which will not be involved in the conference. The read/write input 300 of the memory 298 can be controlled by the microprocessor circuits 216 to write data therein by way of the 8-input data bus 302.

During the actual conferencing, the high speed logic circuits 218 cause the conference port RAM 298 to be read during each time slot to provide an indication of whether or not such time slot is to participate in the conference. The 8-bit output of the conference port RAM 298 is connected to an 8:1 multiplexer 304. The one-of-eight selection is carried out by the three least significant bits output by the port time slot counter 294. The three least significant counter bits are connected to the multiplexer 304 by bus 306. The conference port RAM 298 is read once prior to eight consecutive bus time slot periods, the address input on bus 296 comprises the most significant seven bits, and thus remains the same for eight time slots. With this circuit structure, a high speed conference memory 298 is not required, and thus conferencing is more effective. High speed multiplexers 304 are readily available and relatively inexpensive. Alternatively, a high speed, single output memory could be used without the multiplexer 304. During such eight time slots, the multiplexer is controlled by the three least significant bits on bus 306, thereby sequentially providing a single output, one bit at a time. The multiplexer 304 thereby provides a logic high signal on reset line 292 for each time slot participating in the conference. The logic high signal on the line 292 does not reset the 8-bit input register 280 and thus such register maintains the 8-bit signals on its output. On the other hand, when the multiplexer 304 outputs a logic low level on reset line 292, the 8-bit input register 280 is reset and thereby presents all logic zeros on its output. With this arrangement, the conference port RAM 298 can be written with data information such that for each time slot which is a participant in the conference, the associated 8-bit voice word from the outbound port interface is passed through the register 280 to the memory 282. For those time slots which are not to be participants in the conference, the conference port RAM 298 can be programmed to cause the input register 280 to be reset so that any voice words of the associated time slots are not entered into the conference circuit 220.

For communication systems having more than 1024 time slots, the size of the memory 298, buses and registers can be altered accordingly. The memory 282 can also store data to carry out logical or mathematical operations on data words input to the user port on the TDM bus 30. As an alternative to the foregoing, the signal on reset line 292 may be utilized in controlling the read operation of the address memory 282, rather than controlling the input register 280. In other words, the input register would always latch the voice words in each time slot, but the memory 282 would only be read when the digital word was in a time slot participating in the conference. The signal on line 292 can be employed in many other ways to accomplish the selective reading of the address memory 282.

It should be noted from the foregoing that each user port 12 includes a conference circuit 220, and that only the other conferees voice words are processed by the home conference circuit 220. The voice word generated by the home port does not become conferenced in the home port but are conferenced in the conference circuits of all other port conference circuits that are conferenced with the home port. In this manner, each port creates its own unique conference audio output, which is different than that created at the other ports in the conference. There are thus as many distinct simultaneous summed audio signals as there are participants in the conference. The conference circuit 220 only processes the voice words of all the other conferees without having to be concerned with also integrating the voice words of the person associated with the home user port. The conference circuit of the invention allows one user port to talk on some conferences and listen on some conferences, all simultaneously, and without degradation. No matter how complex the conferencing, each user port 12 puts only its own voice words on the collection bus. Each port takes voice words from all other conferenced user ports that it wants to listen to sequentially from the distribution bus and combines them into a composite voice word for listening by the user of the home port. As used herein, the term "home" port indicates the particular port of interest used by a subscriber. The foregoing technique alleviates the problems heretofore associated with the instant speaker algorithm. As will be described in the more detail below, the conference circuit 220 is also utilized for simple two-way conversations and the transmission of time slot tones to the port instrument interface 214.

In operation of the conference circuit, assume for purposes of example that time slots 100, 200 and 300 are associated with the user ports desired to be involved in a conference telephone call. Further assume that a particular conference circuit is associated with a home user port and time slot 100. Prior to the actual conferencing of the parties, the microprocessor 216 programs the home conference port RAM 298 to program all locations with zeros, except for those locations associated with time slot 200 and time slot 300 of the other ports, which will be programmed to store logic high levels. Since the home port user associated with time slot 100 does not need to hear his or her own voice words, such voice words will not be processed through the home conferencing circuit 220. It should be understood that indeed the person may hear his own voice through side tone facilities of the handset of the subscriber telephone 14.

At the beginning of the framing interval, the port time slot counter 294 is reset. All time slots up to 199 produce corresponding number of conference port memory readouts of digital low signals which are sequentially coupled through the multiplexer 304 to reset the 8-bit input register 280. Accordingly, 8-bit words having all zeros are output on bus 224 during time slots 0–199. During time slot 200, the conference port RAM 298 is read and outputs a logic high signal. The logic high signal appears on reset line 292 and thus does not reset the 8-bit input register 280. Accordingly, the 8-bit voice word associated with time slot 200 is latched into the input 8-bit register 280 and presented on bus 284 as one half of the 16-bit address to the memory 282. The 8-bit result register 290, remaining reset, presents low-order address bits to the memory 282 on address input 286. With this 16-bit address, the ROM 282 is read and a particular location of the memory 282 is accessed. At that location there was previously stored the result of the $\mu$-law addition of an 8-bit zero addend with the addend corresponding to the voice word bits on the bus 284. The accessed memory location is read and presented on bus 288 to the 8-bit result register 290. The result is thus stored in the register 290 and is available for adding with the voice words of subsequent time slots to be conferenced.

During time slots 201–299, the conference port RAM 298 is repetitively read and produces output zeros which maintain the 8-bit input register 280 reset. Accordingly, the voice words associated with the time slots 201–299 do not pass through the input register 280 to the memory 282 and thus are not considered by the conference circuit 220. During the time slot periods 201–299, the result register 290 is not reset, whereupon the previous result word still remains on buses 224 and 286. On the occurrence of time slot 300, the conference port RAM 298 is again read and outputs a digital one-bit which was previously stored in the associated memory location. The logic one appearing on the reset lead 292 prevents the input register 280 from being reset, thereby allowing the 8-bit voice word associated with time slot 300 to be presented to the memory 282 on address input bus 284. The new address input to the memory 282 on bus 284, together with the previous result voice word on the other address input 286 are presented to the memory 282. The word adder memory 282 is then read and the data contained at the accessed location is output on bus 288. The output comprises a nonlinear result of two $\mu$-law voice words, and is latched into the result register 290. The output bus 224 then holds the result of the summation steps of adding the voice word of time slot 200 and the voice word of time slot 300. At the end of the frame interval, the resultant voice word on bus 224 is transferred to the subscriber instrument interface 214 where it is converted into an analog waveform to derive a voice waveform. During the same framing interval, a sample of the analog waveform from the home port telephone set 14 is digitized and placed into time slot 100 by the inbound port interface 212. The conferees of time slots 200 and 300 would receive such sample, together with the other parties' samples and produce different conference result voice words. Thus, each party of the conference hears only the results of the other parties' voice words.

The summation of data written into the adder ROM 282 contains substantial duplicate or mirror image information. This can be appreciated as the output of the memory 28 must be the same when different addresses are presented on the input buses 284 and 286, and when the addresses are reversed on the buses. Therefore, in practice the memory only need be 32K bytes, although with the current low cost of memory, a full matrix of 64K bytes is considered preferable to the alternate approach which would also require some form of multiplexing to mirror the memory usage correctly. It should also be appreciated that all audio digital words are processed through the memory 282 before being transferred to the subscriber interface 214. To that end, digital words representative of the call progress tones are also presented to the address input of the memory 282 but appropriate programming of the conference port RAM 298. Although the adder memory 282 is programmed with $\mu$-law encoded summation results, the tone digital words pass therethrough as they are added to a null digital word, and thus remain unchanged.

It can be appreciated that with this conferencing arrangement, any number of conferees can participate in a single conference call, each partys' conference circuit generating resultant voice words on a per frame basis. In addition, any number of different conferences can be simultaneously carried on by the system. Indeed, it is even possible for one party to participate in two different conferences, although this situation has a low degree of practicality.

Exemplary System Conferencing Operation

Figure 12:
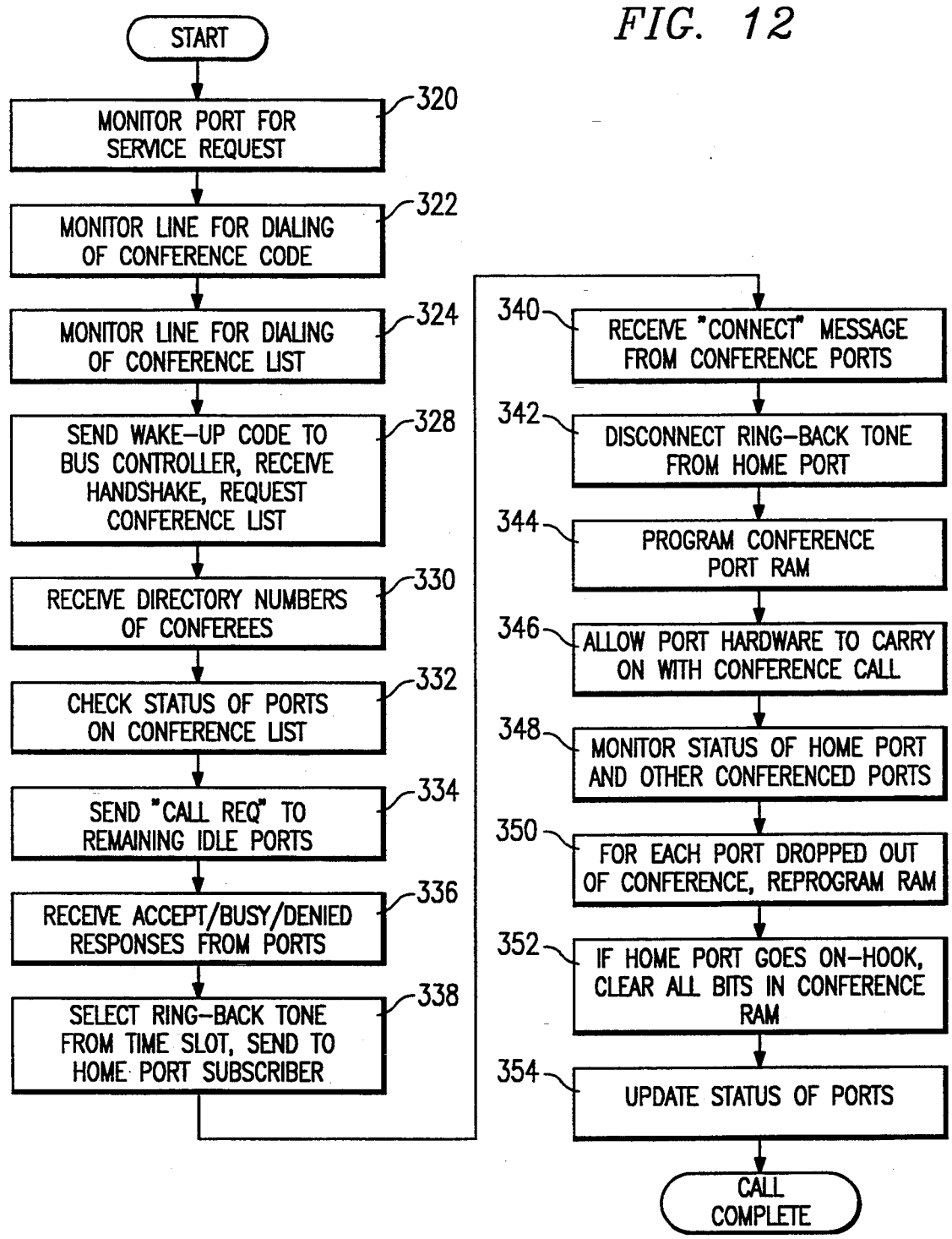
FIG. 12 is a flow chart of the operations carried out by a user port in establishing and carrying out a multi-port conference.

Having set forth the basic operating principles of the conference circuit 220, the generalized system operation of a conference telephone call will next be described. Reference is made to FIG. 12 in conjunction with FIG. 8. The flow chart illustrates the steps carried out by the processor and hardware of each port, it being realized that call processing control is distributed amongst each of the ports and no central call processing function of the communication system 10 exists. The flow chart of FIG. 12 illustrates as step 320 those microprocessor programmed instructions which control the subscriber instrument interface 214 so as to monitor the subscriber instrument 14 for any request for service. In the case of a telephone subscriber set 14, an off-hook condition is sensed by the subscriber interface 214 as a request for service. An indication thereof is transferred to the microprocessor circuits 216 for further processing. In response to the request for service, and as noted by step 322, the subscriber instrument interface 214 monitors DTMF tones or dial pulses on the telephone line for the input of a conference code. The dialed digits received by the interface 214 are transferred in digit form to the microprocessor circuits 216 to determine the nature of the request for service. The communication system 10 of the invention is adapted for providing full telecommunication services, including requests for two-way telephone calls, both locally and long distance, conferencing calls, voice and data calls by way of an ISDN network, data transmission by modems and the like, incoming and outgoing toll calls, call restriction, etc. Such features and functions can be programmed with respect to each user port 12 according to the function desired.

In the event a conference access code is dialed and detected by the microprocessor circuits 216, then the microprocessor 216 waits further for the input of a conference list number, as noted by step 324. The setting up of a conference call may be carried out according to different protocols, although the foregoing is believed to be preferable. In other words, a large conference call of, for example, 50–150 conferees, can be set up by inputting into the home user port 12 a special conference access code, followed by a conference list number. The list number may be a two-digit number, associated with a predefined list of directory numbers to participate in the conference call. Next, step 328 shows that the microprocessor is programmed to transmit a wake-up bus cycle to the master bus controller in the time slot of the home port. In addition, the address of the bus controller is also included in the home port time slot, as noted by the wake-up bus cycle shown in FIG. 2. The port microprocessor 216 will then wait for a handshake signal from the bus controller 34 to confirm a communication path therebetween by way of the respective time slots. The microprocessor of the home user port then sends a message, requesting from the bus controller, the downloading of the conference list identified by the digits dialed by the user. Step 330 illustrates that a message is returned by a similar (wake-up, etc.) technique, in which the bus controller 34 transmits in time slot 5 the data comprising the directory numbers of the requested conference list. In other words, the directory numbers of the 50 conferees would be downloaded to the home user port. The microprocessor circuits 216 of the home user port 12 can then translate the directory numbers by use of its copy of the directory tables to time slots for determining all the other conferees to be participants in the requested conference.

Next, a status check is conducted of the other user ports to determine the general availability thereof. If at least some of the user ports on the conference list are idle, then the microprocessor circuits 216 cause a "call request" to be dispatched to all of the idle ports to be conferenced. This is shown in step 334. The call request is initiated by the home port microprocessor 216 to all the idle ports to be conferenced. When an accept, busy or denied status is received from the ports to be conferenced, as noted by step 336, a ringback tone is sent to the subscriber of the home user port. Such a tone is sent by retrieving from the appropriate tone time slot 6–31, the ringback tone and transferring the samples through the conference port 220 to the subscriber instrument interface 214. This step is generally shown as numeral 38. As depicted in step 340, the microprocessor 216 in the home user port 12 waits for a "connect" message from each of the conferees that are available, i.e., those in which the accept message has been received. The ringback tone is then disconnected from the telephone subscriber set 14 (step 342).

Upon receiving a "connect" message from each conference, the conference port RAM 298 is programmed with a logic one in those time slots corresponding to the user ports to participate in the conference. In all other memory locations corresponding to time slots of parties not to participate, or not yet connected, including the home user port, logic zeros are programmed. This step is shown as reference character 344. Once the conference port RAM 298 is programmed, the high speed hardware of the home user port 12 selects the voice words of each of the ports to be conferenced, and presents the same, one at a time, on bus 222 to the conference circuit 220. At the end of each bus cycle, a composite voice word derived from all the present conferees is transferred to the telephone set 14 of the home user port on internal bus 224. On the other hand, audio sounds input into the telephone set 14 are digitized and transferred on internal bus 226 for output by the home user port. All other ports carry on substantially the same activity.

Also, during the actual telephone conference, the microprocessor 216 is not actively involved in the transferral of voice words. Rather, such activity is handled by the high speed port hardware circuits. Step 346 of the flow chart of FIG. 12 illustrates the major part of the telephone conferencing, namely the actual carrying on of the conversations after the initial setup. Concurrent with the conferencing of step 346, the microprocessor 216 monitors the status of the home port, as well as that of the other conferenced ports (step 348). It may occur that during the conference telephone conversation, one or more other user ports may go on-hook. According to step 350 of the flow chart, each conferenced user port that is dropped during the conference is sensed by the microprocessor 216, whereupon the conference port RAM 298 is reprogrammed to write a logic zero digit in the locations associated with the dropped time slots. Thus, the voice words, noise, etc. of such time slots is prevented from entering the conference circuit 220. As noted by program step 352, if the home user port goes on-hook, the microprocessor 216 rewrites the conference port RAM 298 with all zeros, thereby effectively terminating the conference as to the home user port. It should be realized that the other ports may remain in the conference, even though the home user port initiated the conference call.

The foregoing sets forth the major steps and operations in carrying out communications involving audio or voice signals. However, data bus cycles can be invoked in which data words can be transmitted in allocated time slots between subscriber instruments capable of transmitting and receiving data.

In accordance with another feature, digital control information can be exchanged between ports to achieve radio communications using push-to-talk transmission equipment. Special control features, such as the push-to-talk (PTT) control with PTT arbitration on a first-come, first-served basis are handled similar to the setting up of a call, as described above. The user ports which are conferenced to a PTT driven port (such as a port for controlling radio transmitters) vie for control of the user port by transmitting on the collection bus a PTT status control bit, along with the voice samples. The user port connected to a PTT radio is capable of transmitting in the appropriate status bit time slot a status condition indicating when the PTT transmitter button is pressed, as well as status indicating when the PTT transmitter button is released. The exchange of control information between the various ports involved in a radio conference or simple two-way conversation prevents two persons from using the same frequency at the same time. Essentially, prior to capturing a PTT channel, if one of the message bits is set, then a second user cannot use the frequency, as it is already in use, as noted by the status bit. The speed of response obtained by this technique is a decided advantage over prior art techniques, in which 2600 Hz or similar tones are employed to signal the assertion of the PTT action. In digital switching equipment, the transmission of information by means of tones is extremely inefficient, and the detection thereof is extremely slow, compared to the results obtained by digital techniques. Some applications, such as Air Traffic Control, demand very fast PTT response times.

With the PTT features of the invention, the first PTT received by the PTT-driven port is answered by the called port with an "acceptance" message. That port's voice samples are accepted by the PTT-driven port as long as the successfully contending port PTT control bit is sent. Unsuccessful ports receive a "denied" message and thence generate their own "PTT denied" actions.

System Architectures

FIGS. 13 and 14 depict different architectures in which the principles and concepts of the invention can be embodied. Other architectures employing the invention may be readily adapted by those skilled in the art. With specific reference to FIG. 13, there is illustrated a communication system architecture employing the user port and bus controller architecture of the system 10 described above. The communication system 10 includes the user ports 12 connected to user instruments such as attendant consoles 18. Further included are duplicated TDM buses 260 and 262 connected by duplicated bus controllers 34. A number of user ports 12 and duplicated bus controllers 34 are assembled on printed circuit boards and inserted into a card shelf 264. The card shelf includes a connectorized backplane having parallel conductors defining the duplicated TDM buses 260 and 262. Such a system is operable within itself, together with power supplies and other support circuits, to provide communication services. The user ports 12 can be custom designed to provide interface circuits between the attendant consoles 18, telephone sets, central office switching equipment, radio equipment, etc. Moreover, the card shelf 264 includes a slot for duplicated bus repeaters 32 for extending the duplicated TDM buses 260 and 262 in series to another card shelf 266, by way of a multi-conductor interconnecting ribbon cable 30. The second card shelf 266 can be fabricated substantially identical to the first card shelf 264, and includes user ports 12, other bus repeaters 32", and yet another bus repeater 32' for continuing the TDM bus to yet other card shelves.

By employing 1024 time slots in the TDM buses, 1000 time slots, and thus user ports, can be utilized with user instruments or equipment. Fifty card shelves, each housing twenty user port cards, with one port circuit per card, define a communication system 10 adapted for serving 1000 user instruments or equipment. The remaining 24 time slots are employed by the system 10 as signaling and tone channels for providing intra-system communication. Such a system can employ bus controllers 34 generating bus clock speeds of 8.192 MHz, one audio sample per time slot, and a TDM bus width of twenty-seven conductors, fourteen of which are used in a manner noted by FIG. 2, three other conductors for the clock, frame and frame index timing signals, and ten other conductors employed exclusively for internal data messages between the user ports of the communication system 10.

In the alternative, each TDM collection and distribution bus has 27 conductors to accommodate both voice and data simultaneously. In such alternate embodiment, fewer time slots are required for internal system overhead and thus a thousand time slots can be dedicated to serving user instruments or equipment. This alternative includes only one user port per circuit card for use in extremely high reliability applications, wherein attempts to board-swap port circuits of users experiencing difficulty do not impact other users.

In yet another embodiment of FIG. 13, the width of each TDM bus is doubled, in that more parallel bus conductors are employed, but the bus speed remains the same, namely 8.192 MHz. By doubling the number of conductors in the TDM buses, 2048 time slots are available, thereby supporting a maximum of 2,000 user ports. In this instance, there would be one user port per card, and two audio samples per time slot, the duplicated buses each having one time slot per time slot interval. The doubling of the bus conductors results in each TDM collection and distribution bus having 46 conductors. Of the 46 conductors, 27 carry information similar to the 27 -conductor bus noted above, as well as eight conductors for carrying additional audio samples and 11 conductors for carrying digital address information of the extended bus width.

FIG. 14 illustrates a communication system 270 which is yet another alternative embodiment of the switching system. In this embodiment, the communication system 270 includes a TDM bus width of seventeen conductors, fourteen of which are used in a manner noted in FIG. 2, and three other conductors for the clock, frame and frame index timing signals. Also included are accompanying bus controllers and repeaters, in addition to bus traffic controllers 272 which connect to the duplicated TDM buses 274 and provide a pair of unidirectional output buses 276 and 278 connected to plural user ports, one shown as reference character 280. A number of such bus traffic controllers 272 provide unidirectional pairs to a number of other user ports, sufficient to accommodate the number of time slots of the TDM bus 274.

The bus traffic controllers 272 have nonintelligent circuits which function to transfer voice samples in time slots on the unidirectional bus 278 to the duplicated collection buses of the TDM bus 274. In like manner, the bus controller 272 includes circuits for retrieving time slot samples from the duplicated distribution buses of the TDM bus 274 and driving the unidirectional bus 276. In this manner, each user port 280 can transmit and receive samples, status bits, parity, timing signals, etc. with respect to the duplicated TDM system bus 274. Each bus traffic controller 272 can support up to four port cards 280, with each port card having a total of 8 user ports. The port cards 280 can be fabricated in numerous varieties and may be mixed and matched in any combination as desired to service the user instruments.

User Port—Volume Control Capabilities

Figure 15:
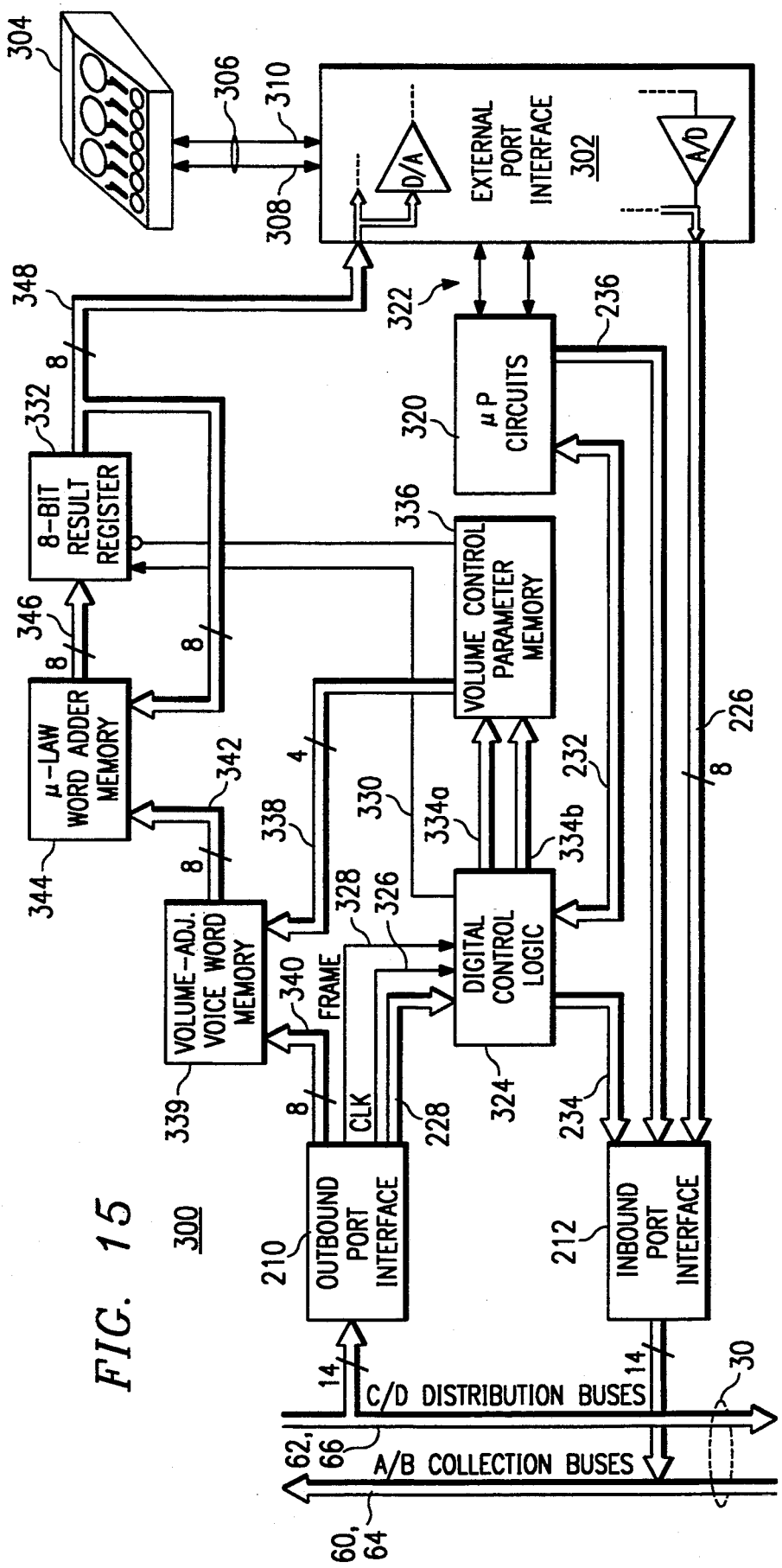
FIG. 15 is a block diagram of a user port having a digital conferencing circuit with volume control capabilities.

FIG. 15 illustrates another embodiment of the communication system of the invention, in which volume control capabilities are provided to change or adjust the volume with respect to each TDM channel. The circuits having the same reference characters are the same or substantially the same circuits described above in connection with the communication system. More particularly, FIG. 15 shows in block diagram form one port of the communication system. The port 300 includes an outbound port interface 210 connected to the duplicated distribution buses 62 and 66. The outbound port interface 210 receives digital voice samples or words in respective time slots from other ports of the system. An inbound port interface 212 is connected to the duplicated TDM collection buses 60 and 64 for transmitting digitized voice or data information coupled externally to the port 300, to the respective time slots of the collection buses 60 and 64.

An external port interface 302 includes conventional interface conversion circuits for coupling analog voice signals and/or data from external or remote communication equipment to the processing circuits of the port 300. The external port interface 302 is shown connected to an air traffic control (ATC) console 304, via an ISDN line 306. The ISDN line includes a voice line 308 and a signalling line 310 for coupling analog voice signals between the ATC console 304 and the external port interface 302. Other voice and signalling lines of the ISDN network 306 can be coupled to other external port interfaces of the communication system. In this manner, two or more channels of the communication system can be utilized to carry on communications in either a conferenced or nonconferenced manner. Moreover, various other land line and radio trunks can be connected to the external port interfaces of the system for providing a wide variety of communication capabilities, such as required in the air traffic control system. While the system shown in FIG. 15 is described below in connection with an air traffic control facility, it should be understood that the principles and concepts of the invention can be utilized in a wide variety of other applications.

The system port 300 includes microprocessor circuits 320 which are programmed to control the various other circuits of the port. In general, the microprocessor circuits 320 monitor the external port interface 302 by way of control lines 322 to determine requests for service and to set up or program the other circuits of the port to carry out the nature of the request for service. The microprocessor circuits 320 are structured to function very similar to those described above in FIG. 8, but are additionally programmed to control volume adjust circuits. The structure identified by the like-numbered reference characters operates in the manner described above, and will not be further repeated or detailed here.

Again, the digital control logic 324 is similar to that described above in connection with block 218. Additionally, the control logic 324 includes as inputs, a time slot clock signal 326 and a framing signal 328. As signal outputs, the digital control logic 324 provides a reset and control signal 330 to a 8-bit result register 332. Address, data and control signals are provided on buses and lines 334a by the digital control logic 324 for controlling one port of a dual port memory 336. The first port 334a is read in synchronism with the time slots to provide volume adjust data to the other volume control circuits of the port 300. The other port 334b of the memory 336 can be dynamically written with volume adjust parameters independently of the other memory port. The dual port memory 336 comprises a volume control parameter memory for storing data indicative of whether various time slots are to participate in a conference, and a volume control parameter associated with each time slot of the system. An output of the dual port memory 336, comprising a 4-bit bus 338, is connected to a read only memory (ROM) 339.

Memory 339 is a volume adjusted voice word memory that is programmed to store a number of different selectable volume levels for each possible digital voice word carried by the TDM time slots of the system. In general, the volume adjusted voice word memory 339 is addressed by a 2-part address, defined by an 8-bit digital voice word on bus 340 and the 4-bit volume modifier signal on bus 338. Based on the digital value programmed in the volume control parameter memory 336 for the particular time slot, the digital voice word carried on the bus 340 accesses a location in the volume adjust voice word memory 339 to provide a readout of a new volume adjusted voice word having a different characteristic amplitude. Because the volume modifier signal on bus 338 constitutes 4-bits, 16 possible different volume levels are addressable for each digital voice word. As will be described below, only eight different volume levels are utilized. The volume adjusted voice word output by the memory 339 is carried as 8 bits on bus 342 to a word adder memory 344. The word adder memory 344 functions substantially identically to memory 282 identified above in FIG. 11. The output of the word adder memory 344 comprises an 8-bit bus 346 coupled to the result register 332. The result register 332 includes an 8-bit output bus 348 which branches back to the word adder memory 344 as an address, as well as to the external port interface 302.

In a practical application of the invention, an air traffic controller communicates with numerous aircraft pilots by way of UHF or VHF radio controls operable on the console 304. Because of atmospheric conditions, distance of the aircraft from the control tower, etc., the various radio signals may vary in amplitude when received by the controller. Accordingly, a significant technical advantage of the invention is that the controller can adjust the volume of each radio channel independently by way of the digital circuits of the port 300. This provides greater flexibility of control than can be provided by using only AGC methods. It should be realized that each port of the communication system is substantially identical to that show in FIG. 15, thus providing both conferencing and volume adjust control capabilities.

In practice, and assuming port 300 is assigned to an air traffic controller operating the console 304, such port can provide conferencing capabilities with respect to a number of aircraft in communications with the controller by UHF or VHF radio signals. Radio transmissions from aircraft are generally received by receivers and carried by way of radio trunks to user ports of the system similar to that shown as reference character 300. The analog voice signals of each port are converted to digital voice words and preferably communicated through the system by way of dedicated time slots. Such digital voice words are made available to the air traffic controller port 300 by the TDM distribution buses 62 and 66. As will be described in more detail below, the ATC controller can independently adjust the volume or amplitude of the voice information processed in each of the time slot channels available to the port 300.

In the event the ATC controller receives a communication from an aircraft which is weak, the controller can increase the volume by communicating such a request to the port 300 on the ISDN line 306. The console 304 preferably includes volume control equipment, such as a knob or switch which can be adjusted for each communication channel. When rotated or activated a number of times, the volume of a specific radio channel is caused to be increased or decreased.

FIG. 16 illustrates the programmed operations of the user port 300 in carrying out volume control or adjust functions. Initially, the microprocessor circuits 320 monitor the external interface port 302 to determine if the user instrument, such as the ATC console 304, is effectively on-hook or off-hook. This is shown as program flow block 400. If an off-hook condition is detected, such as indicated by signalling on the ISDN conductor 310, the program flow branches to block 402. Here, the microprocessor circuits 320 automatically program each channel of the volume control parameter memory 336 to a standard volume level, such as about a 17 dBm level. Next, the external port interface 302 monitors the ISDN line 306 for commands which indicate that the controller has changed the volume of a particular communication channel (block 404). In the event a change in volume of a channel is detected (block 406), such information is communicated by way of the ISDN line 306 to the external port interface 302. The information communicated by the console 304 to the external port interface 302 includes an identification of the communication channel, and the nature and extent of the volume change. This information is communicated from the external port interface 302 to the microprocessor circuits 320 (block 408) and identified. The external port interface 302 includes processing circuits for translating the channel information and the volume information in a format readily recognized and processable by the microprocessor circuits 320. The microprocessor circuits 320 dispatch a memory write instruction by way of bus 232 to the digital control logic 324. The write instruction includes a memory address uniquely associated with the time slot of the channel to be volume adjusted, as well as a volume parameter which identifies a new volume setting. The digital control logic 324, in turn, executes a write operation of the volume control parameter memory 336 via port 334b with such information. Such action is shown by program flow block 410.

For purposes of example, it is assumed that an increase in the volume of channel or time slot 50 is desired by the ATC controller. In the volume control parameter memory location associated with time slot 50, the parameter written therein will represent an increased volume, and the digital state of another bit will indicate the activation or enabling of time slot 50 so that the voice words carried by the time slot are processed and output by port 300.

The detailed operation of the digital volume control circuit is carried out as follows. The volume control parameter memory 336 includes as many addressable memory locations as system time slots. Moreover, the memories 336 and 339 are read in synchronism with the time slots as they occur on the distribution buses 62 and 66. As the outbound port interface receives a digital voice word in time slot 50, such word is presented on the bus 340 as an address to the volume adjusted voice word memory 339. In synchronism therewith, the volume parameter associated with time slot 50 is read out of the memory 336 and presented as a 4-bit address to the volume adjusted voice word memory 339. The 8 bits on bus 340 plus the 4 bits on bus 338 define a composite 12-bit address for the volume adjusted voice word memory 339. Essentially, the volume parameter written into the memory 336 modifies the digital voice word on bus 340 to define a memory location in the volume adjusted voice word memory 339 which has stored therein a new digital word representative of an increased amplitude desired by the controller. It can be appreciated that lower order digital values on bus 338 are used for reducing volume, while the higher order digital values are effective to increase the volume. This, of course, is a function of the manner in which the volume adjusted words are stored in the memory 339.

The mapping of the volume adjusted voice words in the memory 339 are described in more detail below.

In any event, during time slot 50, a composite 12-bit address is presented to the memory 339, whereupon it is read and the output thereof presented on the bus 342. The new volume adjusted voice word having digital values representative of a higher volume are carried on bus 342 to the word adder memory 344. As noted above, the word adder memory 344 and the result register 332 function in a manner similar to that described above in connection with FIG. 11. If no conferencing is involved, the volume adjusted voice word read out of the memory 339 during the time slot 50 is processed through the conference circuit and coupled to the external port interface 302 on bus 348. The volume adjusted voice word, after being converted to an analog sample is then communicated from the external interface 302 to the controller by way of the console 304 and to headphones or speaker equipment (not shown).

As noted by program flow decision block 412, the external port interface monitors the ISDN line 306 for on-hook conditions of the subscriber instrument, i.e., the ATC console 304. If the console 304 is in an effective off-hook condition, program control returns to block 404 to detect further volume changes, if any. On the other hand, if the console 304 status is on-hook, the program flow returns to starting decision block 400.

While FIG. 15 is briefly described in conjunction with a single non-conferenced example, the voice sample of each of multiple conferees can be volume adjusted in a similar manner, insofar as the volume control parameter memory 336 and the volume adjust voice word memory 339 are read in synchronism with each time slot.

Figure 17:
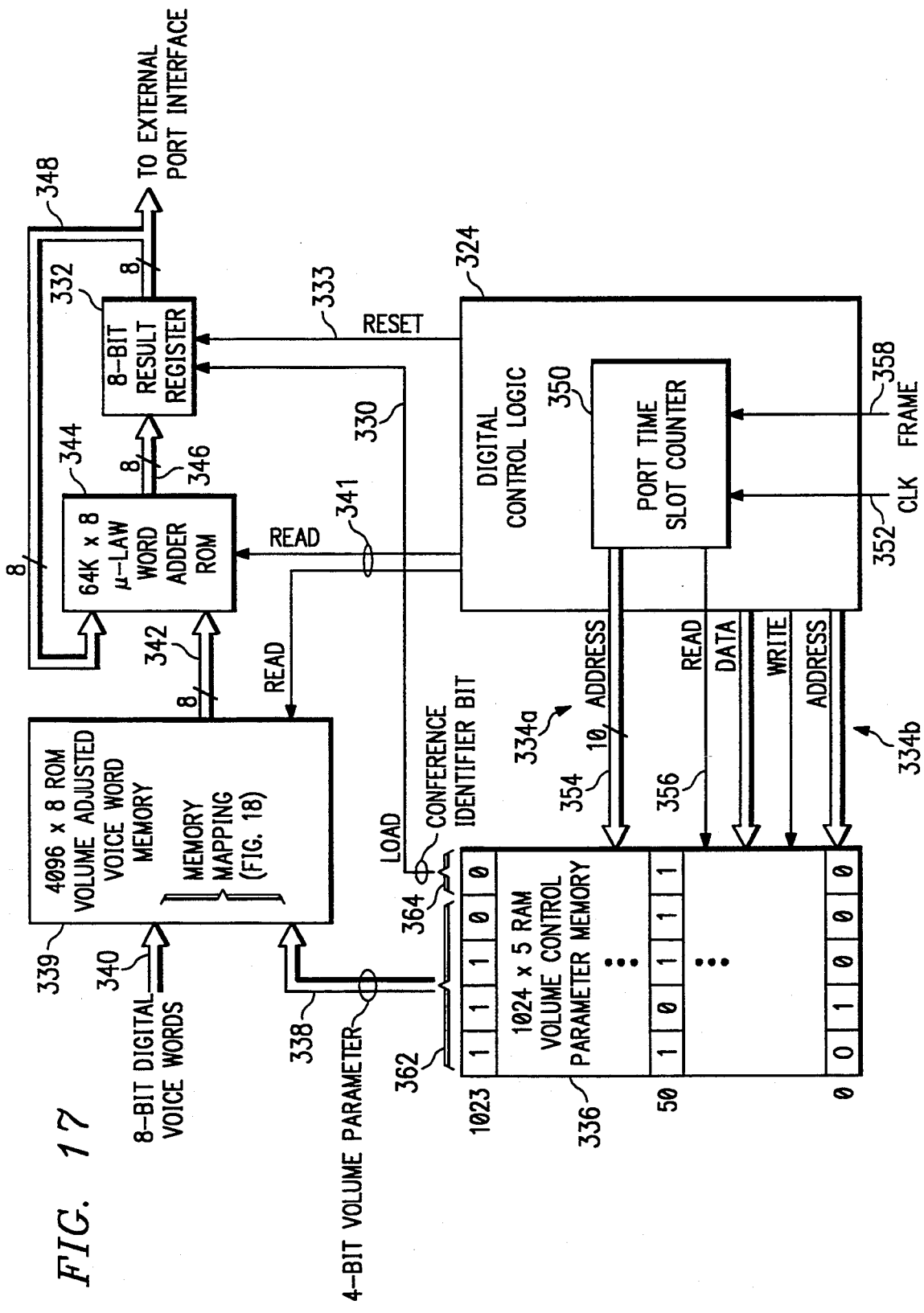
FIG. 17 is a more detailed schematic diagram of a digital conferencing circuit of the invention, and particularly illustrating the volume control circuits.

With reference now to FIG. 17, there is shown in more detail the volume adjust circuits according to the preferred embodiment of the invention. The digital control logic 324 includes a port time slot counter 350 which includes, among other circuitry, a counter clocked by a CLK signal 352 such that address 354 and read signals 356 output from the counter 350 cause the volume control parameter memory 336 to be read in synchronism with each TDM time slot. At the end of each frame interval, which in the preferred form of the invention includes 1024 time slots, a frame signal 358 resets the time slot counter 350.

As noted above, the volume control parameter memory 336 is of the dual port type where each port can be accessed independently and simultaneously. The first port 334a defined by address bus 354 and read signal line 356 defines a first input port that allows the volume control parameter memory 336 to be accessed during each time slot. The other input port 334b defined by a data, address and write signal line allows the volume control parameter memory 336 to be written with data independently of the operation of the other port 334a. Preferably, the memory port 334b is utilized to identify those time slots which are to be processed by the port 300, and to write new volume control parameters when changes in volume are requested. Dual port memories adapted for use with the invention are readily available. Write control circuitry in the digital control logic 324 can be readily devised by those skilled in the art to receive write commands from the microprocessor circuits 320 and convert the same into appropriate write signals to access the volume control parameter memory 336 and write volume parameters and conference identifier bits in specified locations.

The volume control parameter memory 336 comprises a 1024×5 random access memory. The 1024 memory locations correspond to each time slot of the communication system. Further, each location is five bits wide, four bits dedicated to volume parameter data and one bit indicating whether or not the time slot voice word is to be processed and output by the port 300. As noted in FIG. 17, the four bits 362 cause increases in volume with higher value digits, and cause decreases in volume with lower value digits. The 4-bit parameter read out of the memory 336 for each time slot defines an address carried by bus 338 to the volume adjusted voice word memory 339. When at a logic low level, the conference identifier bit 364 prevents the digital voice word in the respective time slot from being processed and coupled to the external interface 302. When written into the volume control parameter memory 336 as a logic high level, the conference identifier bit 364 allows the digital voice word in the associated time slot to be processed and coupled to the external interface 302, and therefrom to the ATC controller headphone or speaker equipment. As will be described in more detail below, the conference identifier bit 364 is utilized to load the 8-bit result register 332 by way of a logic high signal line 330. In other words, when the conference identifier bit 364 is written as a logic zero, the result register 332 is not loaded, whereas when the bit 364 is written in the memory 336 as a logic high level, the result register 332 is loaded with the output of the word adder memory 344.

The volume adjusted voice word memory 339 comprises a 4096×8 ROM. Data bus and read control lines 341 enable the digital control logic to read the ROM memory 339 with voice adjusted data words. In like manner, the word adder ROM 344 can be read by the control logic 324 under control of the microprocessor circuits 320. As noted above, the memory 339 includes a two-part input address. The first address part is an 8-bit address having the most significant bits (MSB), and a second 4-bit address part defining the least significant bits (LSB) of the address. As can be appreciated, for each 8-bit MSB address part carried on address bus 340, the 4 bits on the least significant bit address bus 338 cause a specific memory location to be accessed which effectively modifies the amplitude of the digital voice word on bus 340. The new volume adjusted voice word read from the memory 339 is then coupled to the word adder memory 344.

The composite 12-bit address applied to the volume adjusted voice word memory 339 allows 4096 locations to be accessed in such memory. Effectively, for each digital voice word on MSB address bus 340, there are a possible 16 memory locations having stored therein digital voice words having amplitudes with the same or different voice words as compared to those on bus 340. The mapping of the 12-bit composite address word to define a new volume adjusted voice word is shown in FIG. 18. The sixteen different combinations of the 4-bit LSB address are shown on the left hand portion of FIG. 18. The associated $\mu$-law volume adjusted voice word is shown as an 8-bit word on the right hand side thereof. For purposes of example, it is assumed that the digital voice word presented to the volume adjusted voice word memory 339 on bus 340 represents a nominal 300 millivolt amplitude voice sample. As can be seen from FIG. 18, when the most significant bit of the 4-bit memory address is a logic low level, the digital voice word on bus 340 maps directly into the same voice word in the memory, i.e., a 300 millivolt signal. Therefore, with this combination of 4-bit addresses, no volume adjustment is made to the digital voice word, but rather such word passes through the port 300 with its volume or amplitude remaining the same.

When the most significant bit of the 4-bit memory address is defined by a logic one, the 300 millivolt digital voice word on input bus 340 is mapped into a new volume adjusted voice word, with the exception of one address, namely 4-bit memory address 1100. As can be seen, the range of amplitudes to which the 300 millivolt input signal can be adjusted is 48-1194 millivolts in seven different steps. There are eight different such amplitudes, each differing by about 4 dBm. In the event the 300 millivolt digital voice word carried in a time slot were too loud, as perceived by the air traffic controller, he or she would manipulate the controls on the console 304 to reduce the volume, whereupon the microprocessor circuits 320 would write the appropriate location in the volume control parameter memory 336 with, for example, a 4-bit parameter 1011. The conference identifier bit 364 would, of course, be written in the memory 336 as a digital one so that the appropriate time slot data would be processed by the port. When the digital voice word representative of the 300 millivolt signal is coupled in the appropriate time slot to the memory address bus 340, and when the 4-bit 1011 address is applied via bus 338, the volume adjusted voice word read out of the memory 339 is 10111100, which is a new digital voice word having an amplitude reduced by 4 dBm. If the ATC controller desires a further reduction in the amplitude of the particular channel, the volume control can be further actuated for that channel, whereupon the 4-bit address part is further reduced in digital value to provide corresponding reduced amplitude volume adjusted voice words. It should be understood that different voice words coupled in time slots on bus 340 would be effective to access different locations in the memory 339, but for a defined volume parameter written into memory 336, each voice word would result in a new voice word having its volume adjusted to the same extent. Increases and decreases in the amplitude of the digital voice words are achieved by the writing of new volume control parameters in memory 336 which have corresponding higher and lower digital values.

It should be understood that the mapping between the 4-bit words and the volume adjusted voice words is entirely arbitrary as to the extent of amplitude change. For example, while 4 dBm amplitude changes are noted with respect to a 300 millivolt input signal, other digital voice word amplitudes may be adjusted to a lesser or greater degree. In addition, while the difference in the amplitude change between the volume adjusted voice words stored in the memory 339 is uniform (4 dBm), such uniformity is not absolutely necessary. Indeed, those skilled in the art may find that the mapping of some digital voice words in the memory 339 may be uniform, while others may not. Also, while the upper and lower bounds of the volume adjusted voice words may be the same for various input digital voice words, the range may be different for other input digital voice words.

The word adder memory 344 operating in conjunction with the result register 332 functions substantially similar to that described above in connection with FIG. 11 in conferencing different volume adjusted voice words together, or providing a flow through of such volume adjusted voice words without conferencing. In general, at the start of a frame period, the result register 332 is reset by the digital control logic 324 by reset line 333. Assuming only time slot 50 is to be processed by the port 300, the digital voice words in time slots 1-49 will each be associated with a 0-bit conference identifier bit 364 in the volume control parameter memory 336. Nevertheless, the digital voice words in time slots 1-49 will be employed with associated volume control parameters, whereupon volume adjusted voice word will be read out of memory 339 and input as addresses to the word adder memory 344. Since the output of the result register 332 remains at a reset value for time slots 1-49, a constant address is fed back to the word adder memory 344 on bus 348. The word adder memory 344 provides output results during the first 49 time slots, but such results are not registered in the result register 332, because of the 0-bit conference identifier signal provided thereto on line 330. As a result, only null signals on bus 348 are provided to the external port interface 302 during the first 49 time slots. Such signals are null values, and thus the digital voice words in the first 49 time slots are effectively unprocessed in the port 300.

During time slot 50, the volume control parameter memory 336 is read, and the conference identifier bit 364, being a logic one level, is applied to the load input of the result register 332. Concurrently, the 4-bit volume parameter is applied with the digital voice word as a composite memory address to the volume adjusted voice word memory 339. As a result, a new volume adjusted voice word is read of the memory 339 and applied on input 342 to the word adder memory 344. Because no other time slot is conferenced in the example, the volume adjusted voice word is added with a null address value on bus 348, whereupon no arithmetic addition occurs in the word adder memory 344. Hence, the same volume adjusted voice word applied to the word adder memory on bus 342 is read therefrom on bus 346 and loaded into the result register 332. When loaded, the output of the result register 332 defines the volume adjusted voice word read from memory 339.

In subsequent time slots 51-1024, the conference identifier bits 364 are zero values, since no conferencing is desired. With such zero values, the volume adjusted voice word added in the word adder memory 344 are not loaded in the result register 332, and thus the output thereof remains the same volume adjusted voice word associated with time slot 50 and read from memory 339. At the end of the frame interval, the new volume adjusted voice word associated with time slot 50 is processed by the external port interface 302 and forwarded to the air traffic controller.

When two or more time slots are to be conferenced together, the microprocessor circuits 320 are effective to cause the digital control logic 324 to write the volume control parameter memory 336 with digital one values in the conference identifier bit positions associated with the time slots to be conferenced. Additionally, 4-bit volume control parameters are written into the memory 336 depending on whether or not volume adjustments are to be made, and the extent of the adjustments. Again, for the time slots not to be conferenced, the digital zero values in the conference identifier bit positions 364 prevent the result register 332 from being loaded, thereby effectively suppressing processing of the digital voice words associated with such time slots. For those time slots to be conferenced, the result register is loaded, the result thereof fed back to the word adder memory so that a digital voice word, whether or not volume adjusted, is added to a previous digital voice word conferenced therewith. Subsequent digital voice words participating in the conference are similarly added by the word adder memory 344. The last digital voice word participating in the conference is added to the previous, and the result thereof loaded into the result register 332. Such loading provides the resultant digital voice word on output bus 348 to the external port interface 302. The resultant digital voice word is then converted to an analog signal and passed to the ATC controller.

From the foregoing, disclosed is a technique for providing volume adjustment capabilities in a digital TDM system. A technical advantage of the invention is that by programming the volume adjusted voice word memory, various gradations and ranges of volume adjustment can be easily accomplished. Another technical advantage of the invention is that the digital voice words of different time slots can be volume adjusted independently of each other, and adjusted dynamically during the frame intervals. A further technical advantage of the invention is that the digital voice adjustment technique can be carried out by high speed circuits which are not overly complicated or expensive.

While the preferred embodiment of the invention encompasses the use memory circuits for achieving the adjustment of volume, those skilled in the art may desire to implement the principles and concepts of the invention by way of combinational arithmetic logic circuits. Although flexibility may be compromised, arithmetic adders, subtractors, multipliers or similar circuits may be employed instead of a volume adjusted voice word memory. In other words, a digital value can be either added, subtracted or multiplied with the digital voice word to derive a different voice word representative of a different amplitude signal.

An exemplary embodiment is shown in FIG. 19. An arithmetic logic circuit 420, such as a modified adder for adding two μ-law (or other) encoded 8-bit words, is utilized to generate the new volume adjusted voice words. The arithmetic circuit 420 has a first input to which time slot voice words are coupled. Connected to a second input of the arithmetic circuit 420 is an 8-bit storage register 422. The input of the storage register 422 is connected to the volume control parameter memory 336 to receive data to be arithmetically combined with the digital voice words in the arithmetic circuit 420. The register 422 is loaded at the occurrence of each TDM time slot with an 8-bit word which modifies the digital voice and inputted to the arithmetic circuit. The 8-bit word temporarily stored in the register 422 can simply be added to the digital voice word to generate the new volume adjusted voice word. Other schemes may be devised by those skilled in the art to generate new volume adjusted voice words.

From the foregoing, disclosed is a communication system which can accommodate a large number of users in a non-blocking manner, without the need for central call processing capabilities or a switching network. Instead, the communication system of the invention includes a number of substantially identical user ports, individually programmed for call processing capabilities, all connected to a time division multiplex bus system. A technical advantage of the invention is the simplified structure of the entire communication system itself as well as the universality of the user ports, each of which have a dedicated time slot on the TDM bus. Another technical advantage is the conferencing technique for summing voice words of an unlimited number of ports. Yet another technical advantage of the conferencing system is that irrespective of the number of conferees the quality is not degraded, and there exists no complicated technique for summing the voice words to be conferenced. A further technical advantage of the invention is the capability of digitally controlling the volume of each TDM channel individually. Another technical advantage is the bus arrangement includes collection and distribution branches connected together by a bus controller for providing highly accurate timing signals for each bus.

While the preferred and other embodiments of the invention have been disclosed with reference to specific communication and conferencing systems and methods, it is to be understood that many changes in detail may be made as a matter of engineering choices without departing from the spirit and scope of the invention, as defined by the appended claims.

What is claimed is:

1. A volume control circuit for use in controlling an amplitude of an electrical waveform, comprising:
   a source of input digital signals of a nonlinear format defining corresponding amplitudes of samples of the electrical waveform;
   a word memory addressable by said input digital signals for translating the input digital signals representative of corresponding amplitudes of samples of the electrical waveform into output digital signals of a nonlinear format representative of different amplitudes of the respective samples of the electrical waveform; and
   an adder memory storing digital words of the nonlinear format that are representative of the additive result of pairs of nonlinear words output by the word memory to provide a single output resultant nonlinear digital signal for each pair of output digital signals output from the word memory, whereby amplitude control can be exercised over the input digital signals that are added together to provide the output resultant nonlinar digital signals, without an intermediate conversion to a linear format.

2. The volume control circuit of claim 1, wherein said word memory defines a first memory and said input digital signals define a first address, and wherein said source of input digital signals comprises a time division multiplex bus having a plurality of time slots, and further including a second memory storing a volume parameter for each said time slot, an output of the second memory defining a second address coupled to an input of said first memory.

3. The volume control circuit of claim 2, wherein said first memory and said second memory are read synchronously with respect to each of said time slots, and the volume parameter read from the second memory is combined with the input digital signals of the time slots to define a composite address for addressing the first memory.

4. The volume control circuit of claim 3, further including a processor circuit for writing the second memory for changing the volume parameters stored therein that are associated with the respective time slots.

5. The volume control circuit of claim 1, wherein said word memory defines a first memory, and wherein said input digital signals define a first address applied to the first memory for accessing the first memory to provide output digital signals identical to the corresponding input digital signals if no translation is desired, and further including a second address input to said first memory, said second address being effective to cause a translation of the input digital signals into the output digital signals that are different from the corresponding input digital signals so that an output electrical waveform generated from the output digital signals has an amplitude different from the input electrical waveform.

6. The volume control circuit of claim 5, further including means for changing the address at said second address input to said first memory to change the corresponding amplitudes of the output electrical waveform represented by the output digital signals by a specified amount.

7. The volume control circuit of claim 1, wherein said word memory is programmed to store plural different translations of each input nonlinear digital signal to different output nonlinear digital signals.

8. The volume control circuit of claim 2, further including a digital conference circuit including said adder memory for receiving the translated output nonlinear digital signals of the first memory and adding translated output nonlinear digital signals to be conferenced in respect time slots.

9. The volume control circuit of claim 1, wherein the word memory stores digital words representative of volume levels greater than the corresponding input digital signals used to address the word memory.

10. The volume control circuit of claim 1, wherein said conference circuit includes a result register for temporarily storing an output of the adder memory, and an output of said result register defining the second address input of said adder memory.

11. An amplitude control circuit for use in controlling digitized signals representative of an amplitude of a sampled input electrical waveform, comprising:
   a time division multiplex (TDM) bus having time slots carrying input digital words;
   an amplitude adjust memory addressable by said input digital words, said amplitude adjust memory storing data for producing output digital words representative of amplitudes of an output electrical waveform sample;
   an amplitude parameter memory storing an amplitude parameter associated with each of said time slots, an output of the amplitude parameter memory defining an address coupled to a second input of said amplitude adjust memory;
   a word adder ROM having a first input for receiving the output digital words of the amplitude adjust memory, and having a second input, said word adder ROM having stored therein summation results of a plurality of combinations of inputs applied to the first and second inputs thereof, and having an output defined by a readout of the word adder ROM;
   a latched output circuit of the word adder ROM providing an output of the amplitude control circuit, which output is coupled back to the second input of the word adder ROM; and
   a clock circuit for reading the amplitude adjust memory and the amplitude parameter memory in synchronism with each of said time slots so that each input digital word can be amplitude adjusted independently of other input digital words carried by the TDM bus.

12. The amplitude control circuit of claim 11, further including a processor circuit for writing the amplitude parameter memory with different parameters to change the amplitude adjustment of desired input digital words when applied to the amplitude adjust memory.

13. The amplitude control circuit of claim 11, wherein the amplitude parameter memory includes plural outputs defining an N-bit word so that an amplitude represented by each input digital word can be adjusted to $2^N$ amplitudes.

14. The amplitude control circuit of claim 11, wherein said amplitude parameter memory comprises a dual port memory that can be read and written simultaneously.

15. The amplitude control circuit of claim 11, wherein said amplitude parameter memory stores data in such a manner that for linear changes in volume represented by the input digital words input to the amplitude adjust memory, the translation of the output digital words is also linear.

16. The amplitude control circuit of claim 11, further including in combination a conference circuit for adding together amplitude adjusted signals output from said amplitude adjust memory and associated with different time slots.

17. The amplitude control circuit of claim 16, wherein said conference circuit comprises a control circuit for controlling whether said latched output circuit of the word adder ROM retains latched data associated with time slots, and thus controls the data that is coupled to the second input of the word adder ROM.

18. The amplitude control circuit of claim 17, wherein said control circuit includes a data bit read out of said amplitude parameter memory for each of said time slots, said data bit being effective to control whether the latched output circuit of the word adder ROM is coupled back to the second input thereof.

19. The amplitude control circuit of claim 18, wherein said amplitude parameter memory stores a plurality of data bits therein in association with each of said time slots, ones of said data bits of the amplitude parameter memory defining address bits for said amplitude adjust memory, and a remainder of the data bits of the amplitude parameter memory for controlling the latched output circuit of the word adder ROM.

20. A time division multiplex communication system having capabilities for adjusting amplitudes represented by digital words carried by TDM time slot of the system, comprising:
   a plurality of user ports, each associated with a communication line;
   a TDM bus connecting each of said user ports together, said TDM bus having a plurality of time slots for carrying digital words between each of said user ports;
   the user ports including an amplitude adjust circuit including an amplitude adjust memory addressable by said digital words, and a plurality of addressable locations storing other digital words representing adjusted amplitude digital words;
   an amplitude parameter memory storing an amplitude parameter associated with each said time slot, an output of the amplitude parameter memory defining an address coupled to an input of said amplitude adjust memory, said amplitude parameter memory output defining the extent of amplitude adjustment of the time slot digital words;
   a programmable conference circuit for allowing time slot digital words to pass therethrough and not be added with other nonconferenced digital words when conferencing is not programmed, and for combining with other conferenced digital words when conferencing is programmed, whereby amplitude adjustment of time slot digital words is provided whether or not digital words are to be conferenced with other digital words; and a processor for writing the amplitude parameter memory with parameters to define the amount of amplitude adjustment of the time slot digital words.

21. The TDM communication system of claim 20 wherein the conference circuit adds together amplitude adjusted signals output from said amplitude adjust memory.

22. The TDM communication system of claim 20, further including means for reading the amplitude adjust memory and the amplitude parameter memory in synchronism with the time slots.

23. The TDM communication system of claim 20, wherein said amplitude parameter memory has one output coupled to the amplitude adjust circuit to control the extent of amplitude adjustment of the time slot digital words, and another output to control whether or not conferencing of time slot digital words is to be carried out.

24. The TDM communication system of claim 23, wherein said other output of the amplitude parameter memory controls the conference circuit such that for a first condition of the other output, plural outputs of the amplitude adjust memory are combined together to provide conferencing, and for a second condition of the other output of the amplitude parameter memory the outputs of the amplitude adjust memory are passed without combining with other time slot digital words through the conference circuit.

25. The TDM communication system of claim 20, wherein said amplitude parameter memory comprises a dual port memory of a type that can be updated while at the same time providing addresses to the amplitude adjust memory.

26. A method for adjusting the amplitude of samples of electrical waveforms represented by PCM words carried in a time division multiplex switching system, comprising the steps of:

addressing an amplitude adjust memory with PCM base addresses which include a first part and a second part, the first part includes PCM words carried in the respective time slots of the TDM system;

modifying the PCM base address second part to the memory to derive a readout from the memory defining other PCM words representing adjusted amplitudes of the samples of the electrical waveform;

responding to a change in position of a manual volume control associated with samples of the electrical waveforms by causing a modification of said PCM base address second part to the amplitude adjust memory to provide readout PCM voice words representative of amplitudes different from the amplitudes represented by the respective PCM time slot words; and converting the other PCM words read from the memory to audio sounds.

27. The method of claim 26, further including addressing said amplitude adjust memory with PCM words in different time slots of a frame of time slots, and adjusting the amplitudes represented by certain of the PCM words by different amounts.

28. The method of claim 27, further including reading an amplitude parameter memory to derive an output used to address the amplitude adjust memory, the amplitude parameter memory storing amplitude parameter data associated with each time slot in a frame.

29. The method of claim 28, further including reading the amplitude adjust memory and the amplitude parameter memory during said each time slot so that each associated PCM word can be independently adjusted as to a representative amplitude.

30. The method of claim 26, further including conferencing together different amplitude adjusted PCM words by combining said PCM words together.

31. A method for adjusting digital words in a TDM switching system that are representative of respective amplitudes of samples of an electrical waveform, comprising the steps of:

receiving digital words in respective time slots of a TDM bus;

accessing an amplitude adjustment memory and an amplitude parameter memory during each said respective time slot, including accessing the amplitude parameter memory to derive an output defining an amplitude parameter associated with each said respective time slot;

accessing the amplitude adjust memory with the digital words carried by the respective time slots and with the output of the amplitude parameter memory to produce an amplitude adjust memory readout defining adjusted digital words representing adjusted amplitudes of the samples of the electrical waveform;

controlling a conference circuit to carry the readout of the amplitude adjust memory without combining the adjusted digital words with other time slot digital words if conferencing is not to be carried out, and to combine the readout of the amplitude adjust memory by combining the adjusted digital words with other time slot digital words if conferencing is to be carried out, whereby the time slot digital words can be processed for amplitude adjustment whether or not conferenced with other digital words; and converting the adjusted amplitude digital words into respective analog signals.

32. The method of claim 31, further including writing the amplitude parameter memory with data defining the amount to which a digital word of a time slot is to be adjusted to represent a different amplitude of a sample of an electrical waveform.

33. The method of claim 32, further including responding to a request to change the amplitude of signals associated with a particular time slot, and writing a location in the amplitude parameter memory associated with said particular time slot with a different amplitude parameter.

34. The method of claim 31, further including conferencing said adjusted digital words associated with different time slots together by adding the adjusted digital words together.

35. The method of claim 31, further including storing in the amplitude parameter memory a conferencing parameter indicating whether conferencing is to be carried out.

36. The method of claim 35, further including controlling a digital word combining circuit with the conferencing parameter stored in the amplitude parameter memory.

37. The method of claim 35, further including storing a conferencing parameter in the amplitude parameter memory for each time slot of the TDM bus.

38. The method of claim 36, further including using the conferencing parameter to latch an output of the word combining circuit with an amplitude adjusted digital word when conferencing is to be carried out, and to prevent latching of the output of the word combining circuit when conferencing is not to be carried out.

39. A method of providing adjustment of amplitude characteristics represented by PCM words in a TDM system to achieve volume control, comprising the steps of:
 providing a first memory addressable with M+N address bits;
 connecting the first memory so that PCM words from a TDM bus of the TDM system having M bits per time slot are coupled to an M-bit address input of the memory;
 providing a second memory addressable sequentially with time slots of the TDM bus so that an output thereof having N bits is coupled to an N-bit address input of the first memory;
 storing in the first memory PCM words representative of different amplitudes of voice signals carried on the TDM bus; and
 storing in the second memory N-bit data words that correspond to different volume levels of PCM words, at least one data word of the second memory having a bit configuration such that when appended to the PCM words of the TDM bus to form an M+N bit address that is coupled to the first memory, the PCM words read from the first memory as a result of the M+N bit address are identical to the M-bit PCM words applied as an address to the M-bit address input of the first memory, and the second memory has stored therein other data words such that when appended to the PCM words of the TDM bus to form the M+N bit address that is coupled to the first memory, the PCM words read from the first memory are different from the M-bit PCM words applied as an address to the N-bit address input of the first memory.

40. The method of claim 39, further including storing in the second memory at least one bit of data for indicating whether a PCM word on the TDM bus is to be conferenced.

41. The method of claim 40, further including coupling output PCM words from the first memory to a first input of an adder circuit, and coupling output PCM words from the adder circuits to a register, and coupling output PCM words from the register to a second input of the adder circuit, and controlling the register with the one bit of data read from the second memory to control conferencing.

* * * * *